(12) United States Patent
Hoagland et al.

(10) Patent No.: US 10,738,999 B2
(45) Date of Patent: Aug. 11, 2020

(54) TRIGGER DEVICES FOR EXOTHERMIX WELDS

(71) Applicant: Hubbell Incorporated, Shelton, CT (US)

(72) Inventors: Timothy Charles Hoagland, Tulsa, OK (US); Richard Wallace Ceass, Tulsa, OK (US); Mamoon Tawfiq Abedraboh, Tulsa, OK (US)

(73) Assignee: Hubbell Incorporated, Shelton, CT (US)

( * ) Notice: Subject to any disclaimer, the term of this patent is extended or adjusted under 35 U.S.C. 154(b) by 107 days.

(21) Appl. No.: 16/151,063

(22) Filed: Oct. 3, 2018

(65) Prior Publication Data

US 2019/0101288 A1     Apr. 4, 2019

Related U.S. Application Data

(60) Provisional application No. 62/567,294, filed on Oct. 3, 2017.

(51) Int. Cl.
| | | |
|---|---|---|
| *B23K 1/00* | (2006.01) | |
| *F23Q 1/02* | (2006.01) | |
| *B23K 23/00* | (2006.01) | |

(52) U.S. Cl.
CPC .............. *F23Q 1/02* (2013.01); *B23K 23/00* (2013.01); *B23K 1/0006* (2013.01)

(58) Field of Classification Search
CPC .... B23K 23/00; B23K 2101/32; B23K 37/06; B23K 2101/06; B23K 2101/38;
(Continued)

(56) References Cited

U.S. PATENT DOCUMENTS

| | | |
|---|---|---|
| 1,997,235 A | 4/1935 | Schrodel |
| D214,092 S | 5/1969 | Bogaerts |
| | (Continued) | |

FOREIGN PATENT DOCUMENTS

| | | |
|---|---|---|
| DE | 3206533 | 8/1983 |
| EP | 0870568 | 10/1998 |
| | (Continued) | |

OTHER PUBLICATIONS

Furseweld Grounding Catalog, Section G, © 2002 Thomas & Betts Corporation, printed from their website @ www.tnb.com, 68 pages.
(Continued)

*Primary Examiner* — Erin B Saad
(74) *Attorney, Agent, or Firm* — Wissing Miller LLP

(57) ABSTRACT

Trigger devices for igniting an exothermic reaction is provided. The trigger devices may be flint type trigger devices and electronic type trigger devices. The flint type trigger device has a housing with a spark opening on a rear wall of the housing. A mold mounting assembly is secured to an exterior of the rear wall of the housing. A motor assembly is secured to the inside of the rear wall of the housing. The motor assembly has a flint wheel attached to a shaft of a motor, where the flint wheel is located adjacent the spark opening. A flint assembly is positioned within the housing such that a flint of the flint assembly is in contact with the flint wheel. A controller positioned within the housing is configured to selectively activate the motor to cause the flint wheel to rotate against the flint to create one or more sparks that are ejected from the spark opening.

26 Claims, 23 Drawing Sheets

(58) Field of Classification Search
CPC .. B23K 25/00; B23K 37/0435; G05B 19/042; G05B 19/0426; G05B 2219/23051; G05B 2219/23267; G05B 2219/25097; G05B 2219/25296; G05B 2219/2615

See application file for complete search history.

(56) References Cited

U.S. PATENT DOCUMENTS

| | | | |
|---|---|---|---|
| 3,578,233 A | 5/1971 | Meister | |
| 3,865,305 A | 2/1975 | Sampey | |
| 3,896,482 A | 7/1975 | Cole | |
| 3,922,008 A | 11/1975 | Stiner et al. | |
| 3,934,849 A | 1/1976 | Morain et al. | |
| 3,941,145 A | 3/1976 | Morain et al. | |
| 3,944,262 A | 3/1976 | Stiner et al. | |
| 4,053,134 A | 10/1977 | Peacock | |
| 4,094,536 A | 6/1978 | Cole et al. | |
| 4,099,670 A | 7/1978 | Cole et al. | |
| D249,889 S | 10/1978 | DeAmicis | |
| D265,055 S | 6/1982 | Bone | |
| D277,165 S | 1/1985 | DeVroom | |
| 4,492,005 A | 1/1985 | Begley et al. | |
| 4,667,620 A | 5/1987 | White | |
| 4,889,180 A | 12/1989 | Sloan | |
| 4,889,324 A * | 12/1989 | Brosnan | B23K 23/00 266/157 |
| 4,905,725 A | 3/1990 | Sinkinson et al. | |
| 4,976,366 A | 12/1990 | Russell | |
| 5,061,165 A | 10/1991 | Guzikowski | |
| 5,209,018 A | 5/1993 | Heinrich | |
| D342,747 S | 12/1993 | Garcia | |
| 5,299,609 A | 4/1994 | Wedler | |
| D349,232 S | 8/1994 | Lebow | |
| D351,775 S | 10/1994 | Wedler | |
| 5,366,260 A | 11/1994 | Warluft | |
| 5,397,244 A | 3/1995 | Generoli | |
| 5,431,068 A | 7/1995 | Alsch | |
| 5,524,940 A | 6/1996 | Warluft | |
| 5,533,662 A | 7/1996 | Stidham et al. | |
| 5,538,174 A | 7/1996 | Gaman | |
| D378,094 S | 2/1997 | Eberhard | |
| 5,621,639 A | 4/1997 | Fray | |
| 5,653,279 A * | 8/1997 | Foutz | B23K 23/00 164/54 |
| 5,660,317 A | 8/1997 | Singer et al. | |
| 5,692,785 A | 12/1997 | Warluft et al. | |
| 5,791,698 A | 8/1998 | Warluft et al. | |
| 5,829,510 A * | 11/1998 | Fuchs | B23K 23/00 164/54 |
| 5,853,272 A | 12/1998 | Warluft et al. | |
| 5,954,261 A | 9/1999 | Gaman | |
| 5,975,587 A | 11/1999 | Wood et al. | |
| 5,994,244 A | 11/1999 | Fujiwara et al. | |
| D427,890 S | 7/2000 | Griffin | |
| D442,454 S | 5/2001 | Kolpin | |
| 6,285,008 B1 | 9/2001 | Fleetwood et al. | |
| 6,286,542 B1 | 9/2001 | Morain et al. | |
| 6,382,496 B1 | 5/2002 | Harger | |
| 6,486,402 B2 | 11/2002 | Harger et al. | |
| D481,402 S | 10/2003 | Jenkins et al. | |
| 6,679,712 B2 | 1/2004 | Chang | |
| 6,746,055 B1 | 6/2004 | Wood et al. | |
| 6,776,386 B1 | 8/2004 | Morrissey et al. | |
| 6,786,691 B2 | 9/2004 | Alden, III | |
| 6,994,244 B2 | 2/2006 | Harger et al. | |
| D519,827 S | 5/2006 | Malzacher | |
| 7,240,717 B2 | 7/2007 | Lofton | |
| 7,294,913 B2 | 11/2007 | Fischer et al. | |
| D580,859 S | 11/2008 | Jones et al. | |
| D603,671 S | 11/2009 | Tippman, Sr. | |
| 7,946,466 B1 | 5/2011 | Lofton | |
| 7,950,568 B2 | 5/2011 | Stidham et al. | |
| 7,975,900 B2 | 7/2011 | Lofton et al. | |
| 7,980,017 B2 | 7/2011 | Harman, III | |
| 7,997,166 B2 | 8/2011 | Lauzon et al. | |
| 8,074,864 B2 | 12/2011 | Lofton et al. | |
| D666,976 S | 9/2012 | Gassner | |
| D702,100 S | 4/2014 | Larard | |
| D775,917 S | 1/2017 | Wu | |
| D777,547 S | 1/2017 | Gassner | |
| D778,135 S | 2/2017 | Blank et al. | |
| D783,377 S | 4/2017 | Gargano et al. | |
| 2002/0114665 A1 | 8/2002 | Quardt et al. | |
| 2003/0070381 A1 | 4/2003 | Hawang | |
| 2005/0093412 A1 | 5/2005 | Lykowski et al. | |
| 2006/0060575 A1 | 3/2006 | Lindsey | |
| 2006/0237515 A1 | 10/2006 | Ruland | |
| 2007/0107869 A1 | 5/2007 | Lofton | |
| 2008/0216548 A1 | 9/2008 | Steiner | |
| 2009/0045970 A1 | 2/2009 | Miyabayashi | |
| 2009/0173873 A1 | 7/2009 | Stidham | |
| 2010/0181710 A1 | 7/2010 | Martin | |
| 2011/0132967 A1 | 6/2011 | Lofton | |
| 2012/0055979 A1 | 3/2012 | Alghusain | |
| 2015/0171600 A1 | 6/2015 | Burrows | |
| 2015/0328716 A1 | 11/2015 | Álvarez Cienfuegos | |
| 2016/0243676 A1 | 8/2016 | Grobbel | |

FOREIGN PATENT DOCUMENTS

| | | |
|---|---|---|
| EP | 0870569 | 10/1998 |
| GB | 2527138 | 12/2015 |

OTHER PUBLICATIONS

International Search Report mailed in PCT/US18/54215 dated Nov. 27, 2018.
International Preliminary Report on Patentability mailed in PCT/US2018/054215 dated Apr. 8, 2020.

* cited by examiner

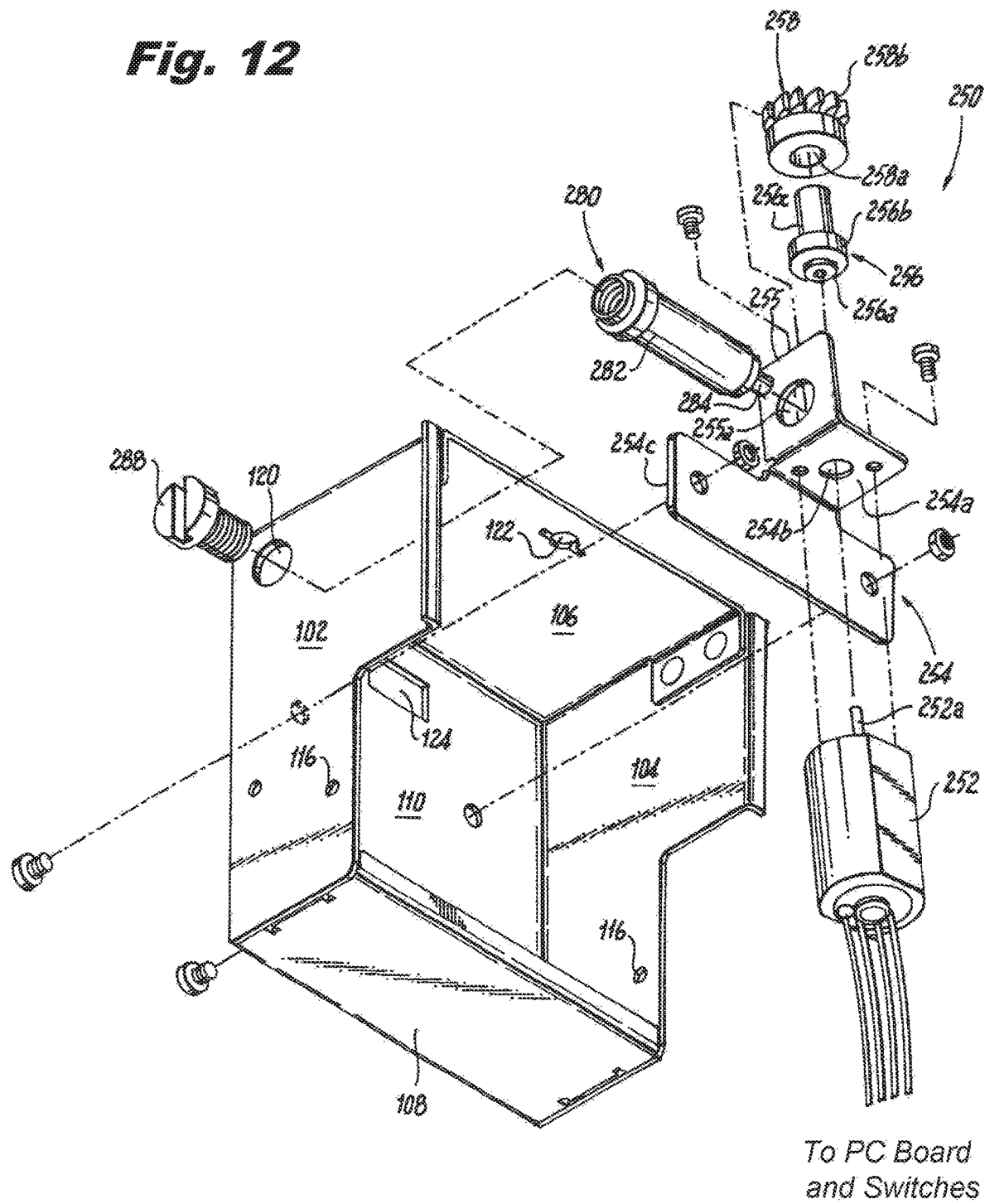

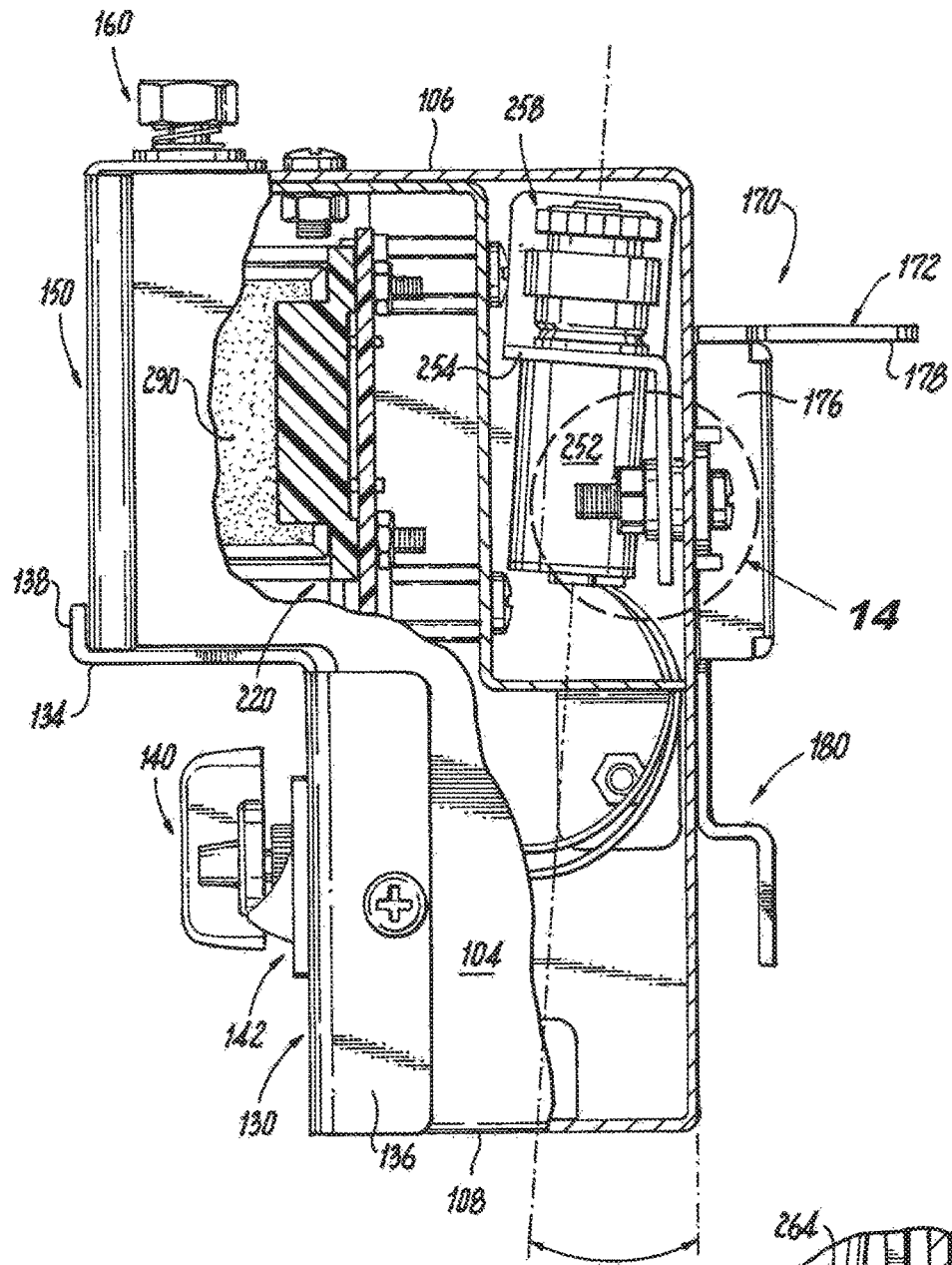
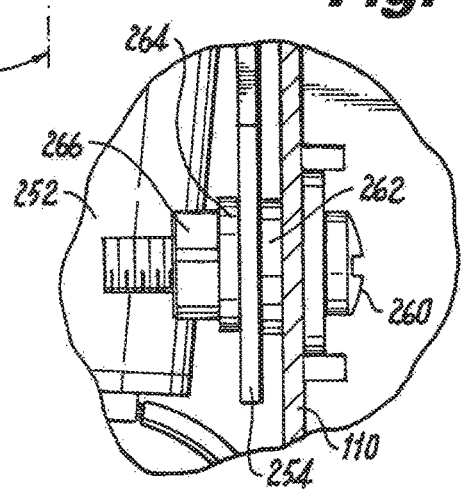
Fig. 13
Fig. 14

TRIGGER DEVICES FOR EXOTHERMIX WELDS

CROSS REFERENCE TO RELATED APPLICATIONS

The present disclosure is based on and claims benefit from co-pending U.S. Provisional Patent Application Ser. No. 62/567,294 filed on Oct. 3, 2017 entitled "Flint Trigger Devices for Exothermic Welds" the entire contents of which are incorporated herein by reference.

BACKGROUND

Field

The present disclosure relates to trigger devices used to ignite a starting powder on an exothermic mold or a weld metal powder within the exothermic mold, and to exothermic welding kits that include a trigger device according to the present disclosure.

Description of the Related Art

Exothermic reaction welding is often used for providing a permanent joint between metal parts including ground rods, electrical conductors, wire cables, piping, etc. Exothermic reaction welding involves the use of a mold, a disc, an exothermic weld metal powder and a mechanism for igniting the weld metal powder. When the weld metal powder is ignited, an exothermic reaction is created within the mold. The exothermic reaction liquefies the powder and the disc of welding material which then flow into a portion of the mold holding the parts to be joined. When the mold has sufficiently cooled, the mold is removed, leaving the parts welded together with a solid molecular bond. During the exothermic reaction, sparks, flames and hot gasses may be discharged from the mold.

Various methods exist for igniting the weld metal powder. One method of igniting the powder involves pouring an ignition powder (also called starting powder) into a hole in a cover of the mold. The ignition powder is then manually ignited using a spark or ignition source such as a flint gun. The ignition powder ignites the powder starting the exothermic reaction. Because the exothermic reaction occurs so quickly, this method forces the technician igniting the ignition powder to be in close proximity to the sparks, flames and hot gasses discharged from the mold may create a potential hazardous situation. Another method of igniting the weld metal powder utilizes a remote ignition system that allows the weld metal powder to be ignited remotely. Remote ignition systems typically include a controller or circuitry which is remotely connected to an ignition box via flexible cable. Generally, the controller includes an on/off switch and a trigger button to remotely initiate the ignition of the exothermic power. The ignition box generally includes one or more contacts which are connected to the flexible cable and an ignition material, such as a strip of wire of two different metallic elements in contact with each other. The ignition material is inserted into the hole in the cover of the mold and into the weld metal powder. When the controller is turned on and the trigger button is pressed, a pulse of energy is sent from the controller to the ignition box via the flexible cable. The ignition box generates a spark which ignites the weld metal powder starting the exothermic reaction.

SUMMARY

The present disclosure provides embodiments of trigger devices for igniting exothermic reactions. The present disclosure provides embodiments of kits for making exothermic welds that include an exothermic reaction mold and a trigger device, and may also include an exothermic weld mold clamp. The present disclosure also provides methods for igniting an exothermic reaction within an exothermic mold.

In an exemplary embodiment of the trigger device, the trigger device is a flint trigger device where a flint is used to generate a spark to ignite a starting powder on an exothermic mold. In an exemplary embodiment, the flint trigger device includes a housing having a spark opening on a rear wall of the housing, a mold mounting assembly, a motor assembly, a flint assembly and a controller. The mold mounting assembly is secured to an exterior of the rear wall of the housing. The motor assembly is secured to the rear wall of the housing and in the interior of the housing. The motor assembly has a flint wheel attached to a shaft of a motor such that the flint wheel is located adjacent the spark opening in the housing. The flint assembly is secured within the housing and is positioned so that a flint of the flint assembly is in contact with the flint wheel of the motor assembly so that rotation of the motor causes the flint and flint wheel to generate one or more sparks. The controller, which may be a printed circuit board assembly, is positioned within the housing and is configured to selectively activate the motor to cause the flint wheel to rotate against the flint to create the one or more sparks which are to be ejected from the spark opening in the housing onto a starting powder when in use. In the above described flint trigger device, the device is an electro-mechanical device where a motor is used to rotate a flint wheel to generate the one or more sparks. In another exemplary embodiment, the flint trigger device may be a mechanical device that uses mechanical mechanisms, such as stored energy from a mainspring, to rotate a flint or drive wheel to generate the one or more sparks.

In an exemplary embodiment of the kit, the kit includes an exothermic mold and a flint trigger device. The exothermic mold may be a horizontal exothermic mold or a vertical exothermic mold. The flint trigger device includes a housing having a spark opening on a rear wall of the housing, a mold mounting assembly, a motor assembly, a flint assembly and a controller. The mold mounting assembly is secured to an exterior of the rear wall of the housing. The motor assembly is secured to the rear wall of the housing and in the interior of the housing. The motor assembly has a flint wheel attached to a shaft of a motor such that the flint wheel is located adjacent the spark opening in the housing. The flint assembly is secured within the housing and is positioned so that a flint of the flint assembly is in contact with the flint wheel of the motor assembly so that rotation of the motor causes the flint and flint wheel to generate one or more sparks. The controller, which may be a printed circuit board assembly, is positioned within the housing and is configured to selectively activate the motor to cause the flint wheel to rotate against the flint to create the one or more sparks which are to be ejected from the spark opening in the housing onto a starting powder when in use. In the above described flint trigger device, the device is an electro-mechanical device where a motor is used to rotate a flint wheel to generate the one or more sparks. In another exemplary embodiment, the flint trigger device may be a mechanical device that uses mechanical mechanisms, such as stored energy from a mainspring, to rotate a flint or drive wheel to generate the one or more sparks.

In an exemplary embodiment of the method for igniting an exothermic reaction within an exothermic mold, the method includes inserting a disc of welding material into a crucible within the exothermic mold, pouring an exothermic reaction powder into the crucible, mounting a flint trigger device to the mold, pouring a starting powder into an opening in a cover of the mold such that a mound of starting powder rests on the cover of the mound, and activating the flint trigger device to eject the one or more sparks from the spark opening in the housing such that the one or more sparks impact the starting powder causing the starting powder to ignite. In this exemplary embodiment, the flint trigger device includes a housing having a spark opening on a rear wall of the housing, a mold mounting assembly, a motor assembly, a flint assembly and a controller. The mold mounting assembly is secured to an exterior of the rear wall of the housing. The motor assembly is secured to the rear wall of the housing and in the interior of the housing. The motor assembly has a flint wheel attached to a shaft of a motor such that the flint wheel is located adjacent the spark opening in the housing. The flint assembly is secured within the housing and is positioned so that a flint of the flint assembly is in contact with the flint wheel of the motor assembly so that rotation of the motor causes the flint and flint wheel to generate one or more sparks. The controller, which may be a printed circuit board assembly, is positioned within the housing and is configured to selectively activate the motor to cause the flint wheel to rotate against the flint to create the one or more sparks which are to be ejected from the spark opening in the housing onto a starting powder when in use. In the above described flint trigger device, the device is an electro-mechanical device where a motor is used to rotate a flint wheel to generate the one or more sparks. In another exemplary embodiment, the flint trigger device may be a mechanical device that uses mechanical mechanisms, such as stored energy from a mainspring, to rotate a flint or drive wheel to generate the one or more sparks.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 12 is a bottom perspective view with parts separated of the interior of the main compartment of the flint trigger device according to the present disclosure, illustrating exemplary embodiments of a motor assembly and flint assembly according to the present disclosure;

FIG. 13 is a cross-sectional view of the flint trigger device of FIG. 3 taken along line 13-13 and illustrating the battery compartment, a printed circuit board assembly and the motor assembly within the main compartment;

FIG. 14 is an enlarged view of a portion of the main compartment taken from detail 14 of FIG. 13, and illustrating a motor mounting bracket of the motor assembly used to secure the motor assembly to the housing;

DETAILED DESCRIPTION

The present disclosure provides embodiments of trigger devices for igniting exothermic reactions. The present disclosure also provides embodiments of kits for making exothermic welds that include an exothermic reaction mold and a trigger device according to the present disclosure, and may also include an exothermic weld mold clamp. The trigger devices may be flint type trigger devices, electronic type trigger devices or electric type trigger devices. For ease of description, the trigger devices of the present disclosure may also be referred to as the "device" in the singular and the "devices" in the plural. The exothermic reaction molds may be referred to as the "mold" in the singular and the "molds" in the plural. The exothermic weld mold clamp may be referred to as the "handle clamp" in the singular and the "handle clamps" in the plural.

Figure 1:
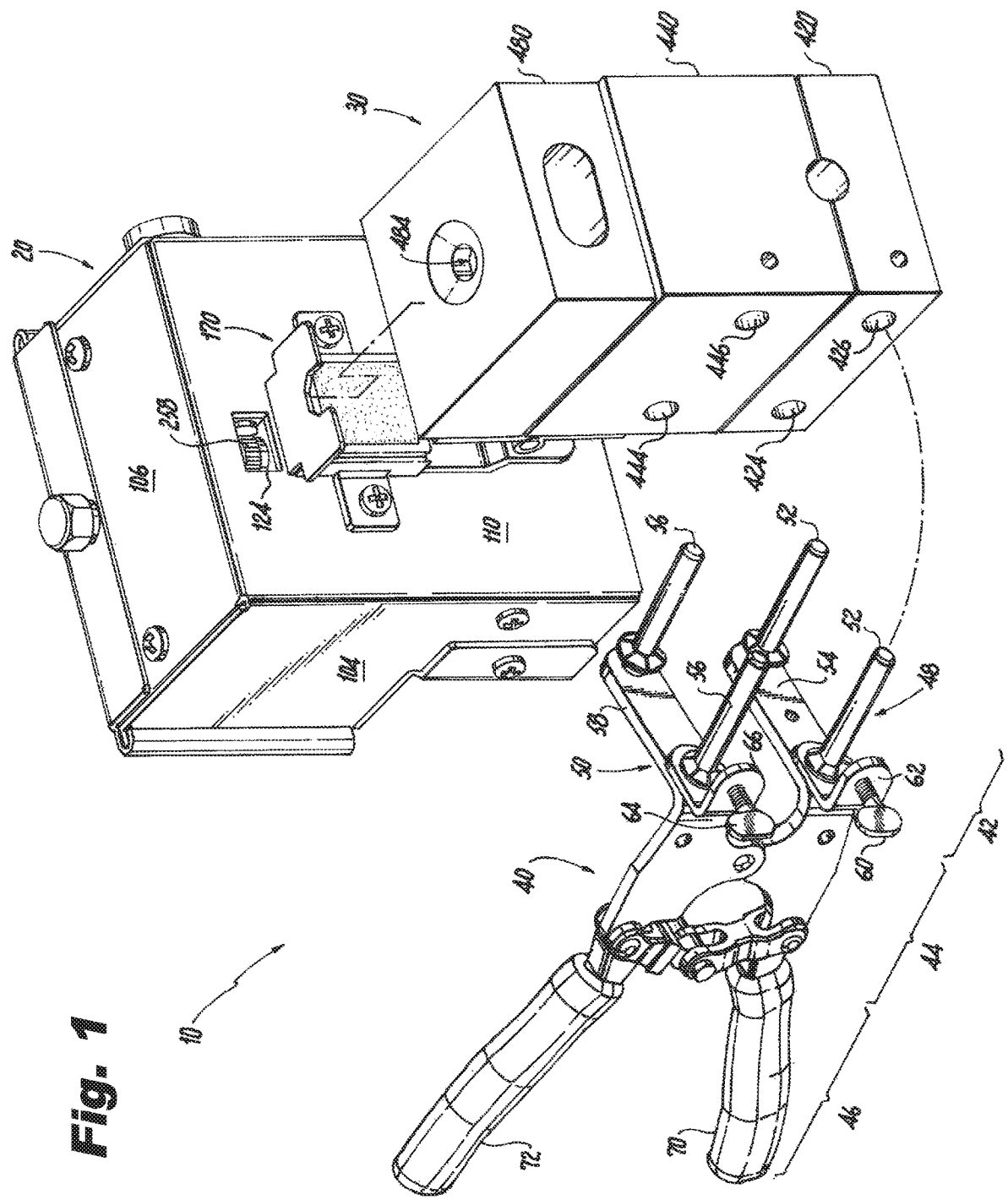
FIG. 1 is a top perspective view of an exemplary embodiment of an exothermic welding kit according to the present disclosure, illustrating a flint trigger device, a mold and a handle clamp according to the present disclosure.

Referring to FIG. 1, an exemplary embodiment of a kit for making exothermic welds is shown. In this exemplary embodiment, the kit 10 includes a device 20, a mold 30 and a handle clamp 40. The device 20 in this exemplary embodiment is a flint trigger type device. The device 20 and mold 30 are described in more detail below. The handle clamp 40 includes an exothermic mold mounting section 42, a movement section 44, and a handle section 46. A more detailed description of an exemplary handle clamp is described in U.S. Publication No. 2006/0237515 published on Oct. 26, 2006 which is incorporated herein by reference. Generally, the mold mounting section 42 has a left section 48 and a right section 50. Each section 48 and 50 is adapted to mate with a portion of an exothermic mold. More specifically, the mold mounting section 42 generally includes a locating system that comprises cantilevered pins 52 extending from a pin arm 54 in the side section 48, and cantilevered pins 56 extending from a pin arm 58 in the side section 50. The mold mounting section 42 also includes a mold locking system that comprises a first mold locking fastener 60, such as a machine screw, associated with left section 48, and a second mold locking fastener 64, such as a machine screw, associated with right section 50. The first mold locking fastener 60 can be threaded into a hole of a lateral side flange 62 that is movably secured to the side section 48. The second mold locking fastener 64 can be threaded into a hole of a lateral side flange 66 movably secured to the side section 50. An example of a suitable mold locking fastener 60 or 64 is a thumb screw.

Continuing to refer to FIG. 1, the locating pins 52 are slid into a first set of handle clamp mounting holes 424 and 426 in the mold 30, and locating pins 56 are slid into a second set of handle clamp mounting holes 444 and 446 in the mold 30. The first mold locking fastener 60 is then screwed into a mounting hole, which may be a threaded or non-threaded mounting hole, in the sides of the mold 30, and the second mold locking fastener 64 is then screwed into mounting holes, which may be threaded or non-threaded mounting holes, in the lateral sides of the mold 30. The first and second mold locking fasteners 60 and 64 are used to lock the mold 30 pieces together and to lock the mold 30 to the handle clamp 40. The movement section 44 of the handle clamp 40 is adapted to move the left and right sections 48 and 50 relative to each other to facilitate gripping and movement of the mold 30. The handle section 46 of the handle clamp 40 is adapted so that a user can grasp the handles 70 and 72 extending from the movement section 44. The embodiment described herein is one exemplary embodiment of a handle clamp. Other types of handle clamps known in the art are also contemplated by the present disclosure.

Turning now to FIGS. 2-11 and 11A, an exemplary embodiment of the device 20 according to the present disclosure is shown. In this exemplary embodiment, the device 20 is a flint type trigger device that includes a housing 100, a main compartment cover 130, a battery compartment cover 150, and a mold mounting assembly 170. The housing 100 has a pair of side walls 102 and 104, a top wall 106, a bottom wall 108 and a rear wall 110. For general reference purposes, the housing 100 can be generally divided into a main compartment portion 112 and a battery compartment portion 114, seen in FIGS. 2 and 5. The main compartment portion 112 houses a motor assembly and a flint assembly, which are described in more detail below. The battery compartment portion 114 houses a battery and a controller, which in this exemplary embodiment is a printed circuit board assembly. The battery supplies power to the device 20. The main compartment portion 112 of the housing 100 near an open front face of the side walls 102 and 104 includes mounting apertures 116, seen in FIG. 5, used to secure the main compartment cover 130 to the housing 100. The battery compartment portion 114 of the housing 100 near an open front face of the side walls 102 and 104 includes mounting flanges 118, seen in FIG. 5, used to secure the battery compartment cover 150 to the housing 100 as described below. The side wall 102 of the housing 100 includes a flint tube aperture 120 used to provide access to a flint within the flint tube and to mount the flint tube assembly to the housing 100. The top wall 106 of the housing 100 includes a locking aperture 122, seen in FIG. 5, used to lock the battery compartment cover 150 to the housing 100. The rear wall 110 of the housing 100 includes a spark opening 124, seen in FIG. 3, used to permit sparks generated within the housing 100 to exit the housing, as described below.

Figure 2:
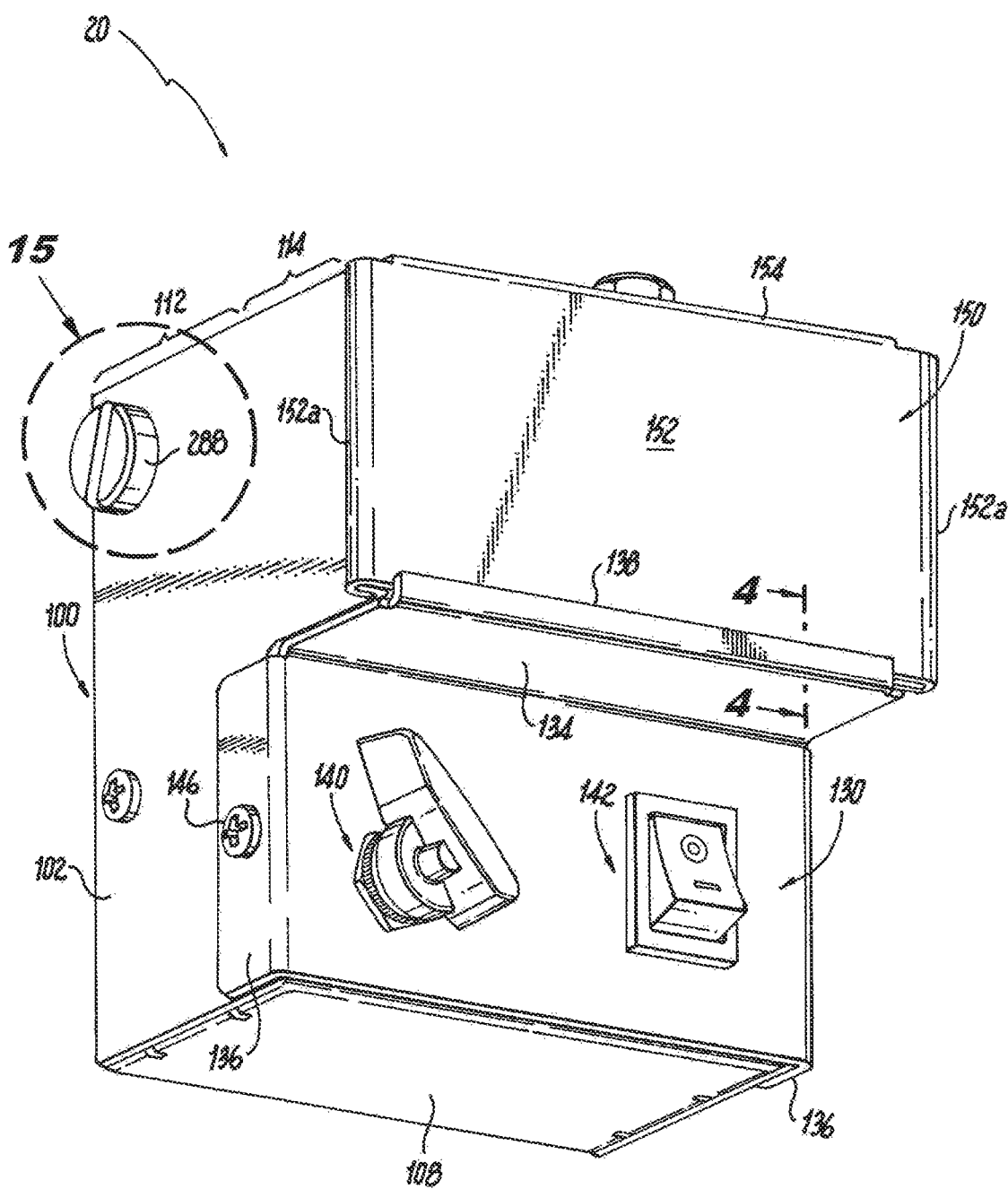
FIG. 2 is a front perspective view of an exemplary embodiment of a flint trigger device according to the present disclosure.
Figure 3:
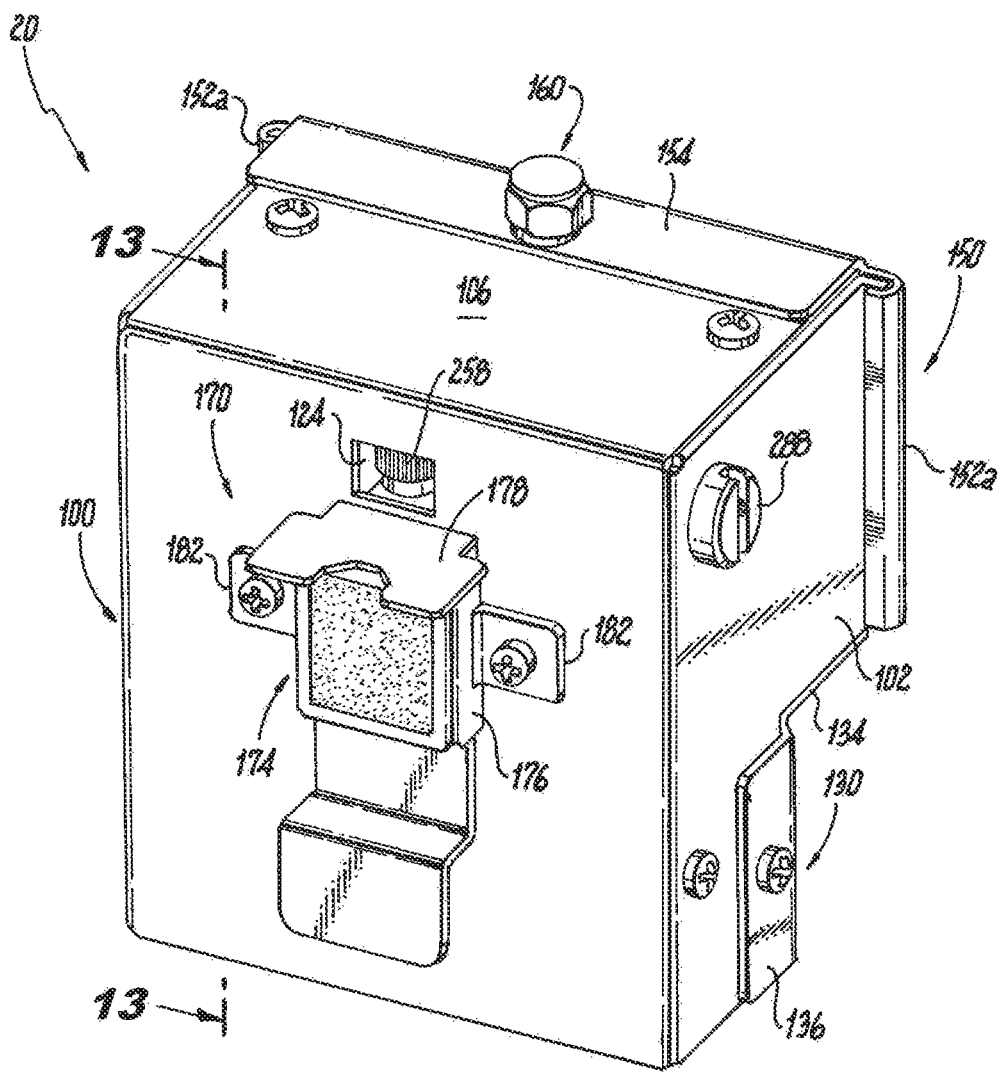
FIG. 3 is a rear perspective view of the flint trigger device of FIG. 2, illustrating an exemplary embodiment of a mold mounting assembly secured to a housing of the flint trigger device, and an opening in the housing through which sparks generated by a flint assembly within the housing can exit the housing.
Figure 4:
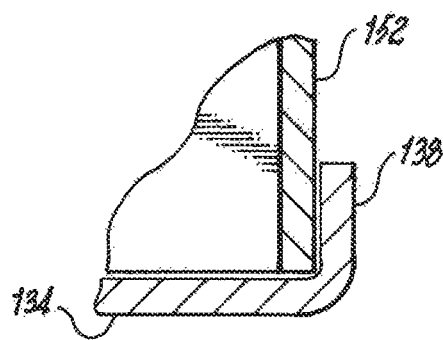
FIG. 4 is a cross-sectional view of a portion of the flint trigger device of FIG. 2 taken along line 4-4 and illustrating an overlap between a main compartment cover and a battery compartment cover.
Figure 5:
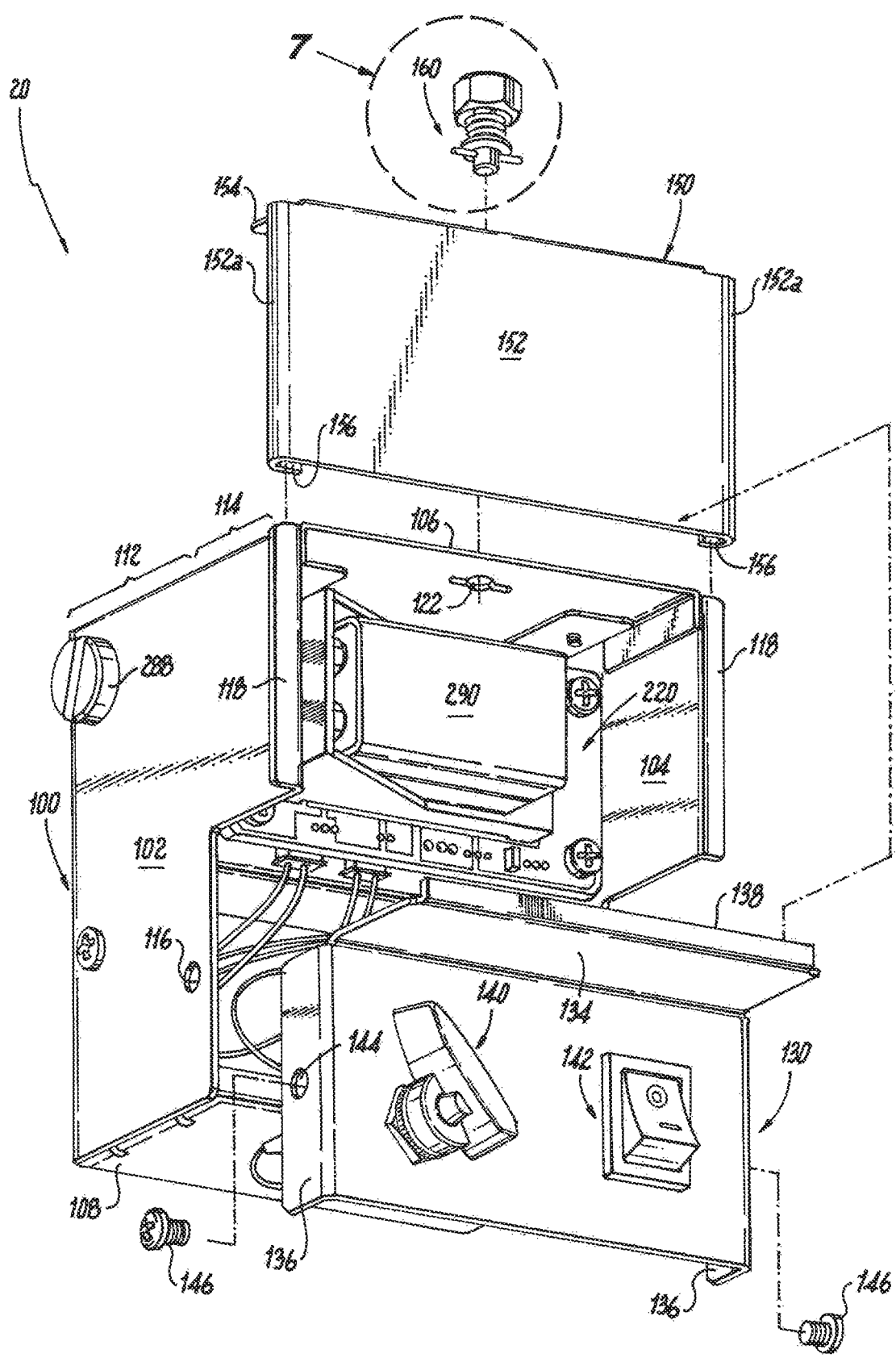
FIG. 5 is a front perspective view of the flint trigger device of FIG. 2 with the main compartment cover and a battery compartment cover separated from the housing.

Referring to FIGS. 2-4, 5 and 6, the main compartment cover 130 is releasably attached to the housing 100 so as to cover the main compartment portion 112. More specifically, the main compartment cover 130 has a front wall 132, a top wall 134, two side mounting flanges 136 extending from the front wall, and an upper flange 138 extending from the top wall 134. The front wall 132 has a timer switch opening configured to receive a portion of a timer switch 140 and a power switch opening configured to receive a power switch 142. Each side mounting flange 136 has a mounting aperture 144, seen in FIG. 5, configured to receive a fastener 146, e.g., a machine screw, which is used to secure the main compartment cover 130 to the housing 100. The top wall 134 covers a portion of the battery compartment portion 114 as shown in FIGS. 2 and 5, and the upper flange 138 overlaps a portion of the front wall 152 of the battery compartment cover 150 as shown in FIGS. 2 and 4.

Continuing to refer to FIGS. 2, 3 and 5, the battery compartment cover 150 is releasably attached to the housing 100 so as to cover the battery compartment portion 114. More specifically, the battery compartment cover 150 has a front wall 152 and top wall 154. The front wall 152 has a rounded lip 152a at each end, as seen in FIG. 5, that forms a slot 156 that mates with flanges 118 on the side walls 102 and 104 of the housing 100 so that the battery compartment cover 150 is releasably secured to the housing 100. The battery compartment cover 150 can be locked to the housing 100 using a lock assembly 160, shown in FIGS. 3, 5, 7 and 8. In this exemplary embodiment, the lock assembly 160 is a bayonet-type lock assembly that includes a lock nut 162, a center shaft 164 extending from the lock nut, a spring 166 that fits over the shaft 164, a washer 168 and a bayonet pin 169. The washer 168 is used to retain the spring and act as a pusher when locking and unlocking the battery compartment cover.

Referring to FIGS. 2-5, 7 and 8, to releasably secure the main compartment cover 130 to the housing 100, the side mounting flanges 136 are positioned over the main compartment portion 112 of the housing 100 and secured to the housing 100 using the fastener 146 passing through mounting aperture 144 and into threaded mounting aperture 116. To releasably secure the battery compartment cover 150 to the housing 100, the slots 156 on the battery compartment cover 150 are slid onto (or mated with) the flanges 118 on the battery compartment portion 114 of the housing 100 until the top wall 154 contacts the top wall 106 of the housing 100. In this configuration, the slots 156 are interconnected with the flanges 118. To lock the battery compartment cover 150 to the housing 100, the shaft 164 of the lock nut 162 and the pin 169 are then inserted into the locking aperture 122 in the top wall 106 of the housing 100 until washer 168 engages the top wall 154 of the battery compartment cover 150. Force is then manually applied to the lock nut 162 to compress the spring 166 permitting the pin 169 to enter into the battery compartment portion 114 of the housing 100, and the lock nut 162 is rotated about 90 degrees. The force on the lock nut 162 is then removed and the spring 166 biases the lock nut to its normal position such that the pin engages the top wall 106 of the housing 100 thereby locking the battery compartment cover 150 to the housing 100. With the battery compartment cover 150 secured to the housing 100, the upper flange 138 of the main compartment cover 130 is positioned over the front wall 152 of the battery compartment cover 150 as seen in FIG. 4.

Figure 9:
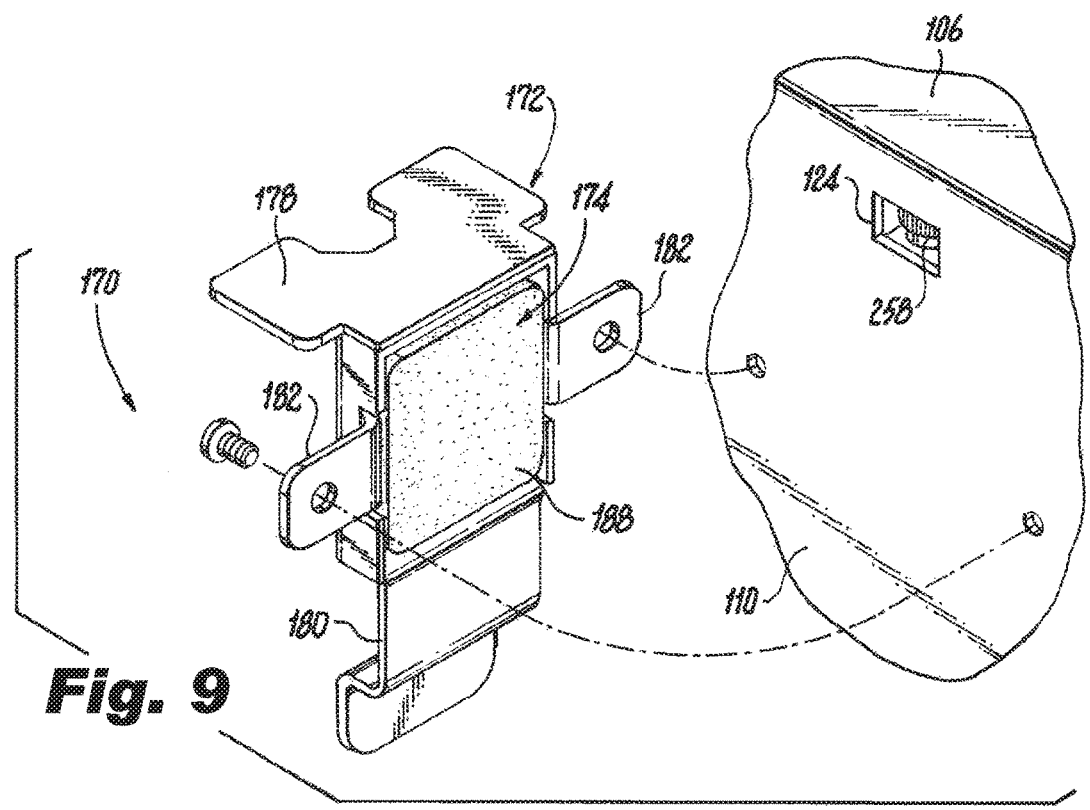
FIG. 9 is a top perspective view of an exemplary embodiment of a mold mounting assembly according to the present disclosure.
Figure 10:
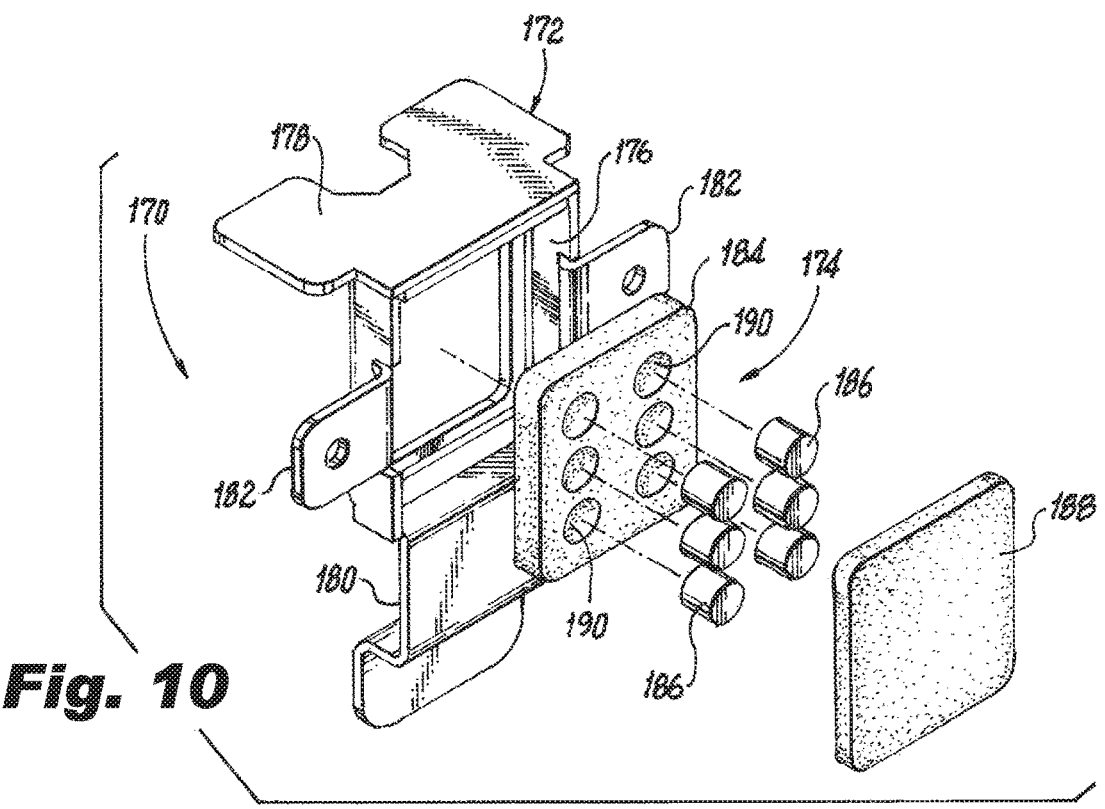
FIG. 10 is a top perspective view with parts separated of the mold mounting assembly of FIG. 9, illustrating a magnet fixture and a magnet assembly.

Referring to FIGS. 9 and 10, an exemplary embodiment of a mold mounting assembly according to the present disclosure is shown. The mold mounting assembly 170 includes a magnet fixture 172 and a magnet assembly 174. The magnet fixture 172 has a magnet compartment 176, a fixture positioning member 178, a hinge bridge 180 and mounting flanges 182. The mounting flanges 182 are used to secure the mold mounting assembly 170 to the housing 100. The magnet compartment 176 is configured and dimensions to house the magnet assembly 174. In this exemplary embodiment, the magnet assembly 174 includes a magnet holder 184, one or more magnets 186 and a magnet cover 188. The magnets 186 are inserted into openings 190 within the magnet holder 184. The openings 190 in the magnet holder 184 extend at least partially through the magnet holder such that the magnets 186 remain within the magnet holder by a friction fit. The magnet cover 188 is configured to fit over the magnet holder 184 to cover the magnets 186 and prevent the magnets from being removed from the magnet holder. In this exemplary embodiment, the magnet holder 184 and the magnet cover 188 are made of an insulating material that is sufficiently dense and structurally strong so that it does not soften appreciably under the application of heat so that the magnets 186 are not damaged by heat generated by the exothermic reaction within the mold, described below. An example of such a material is a thermoset plastic laminate, such as phenolic resin laminate sheet.

Figure 11:
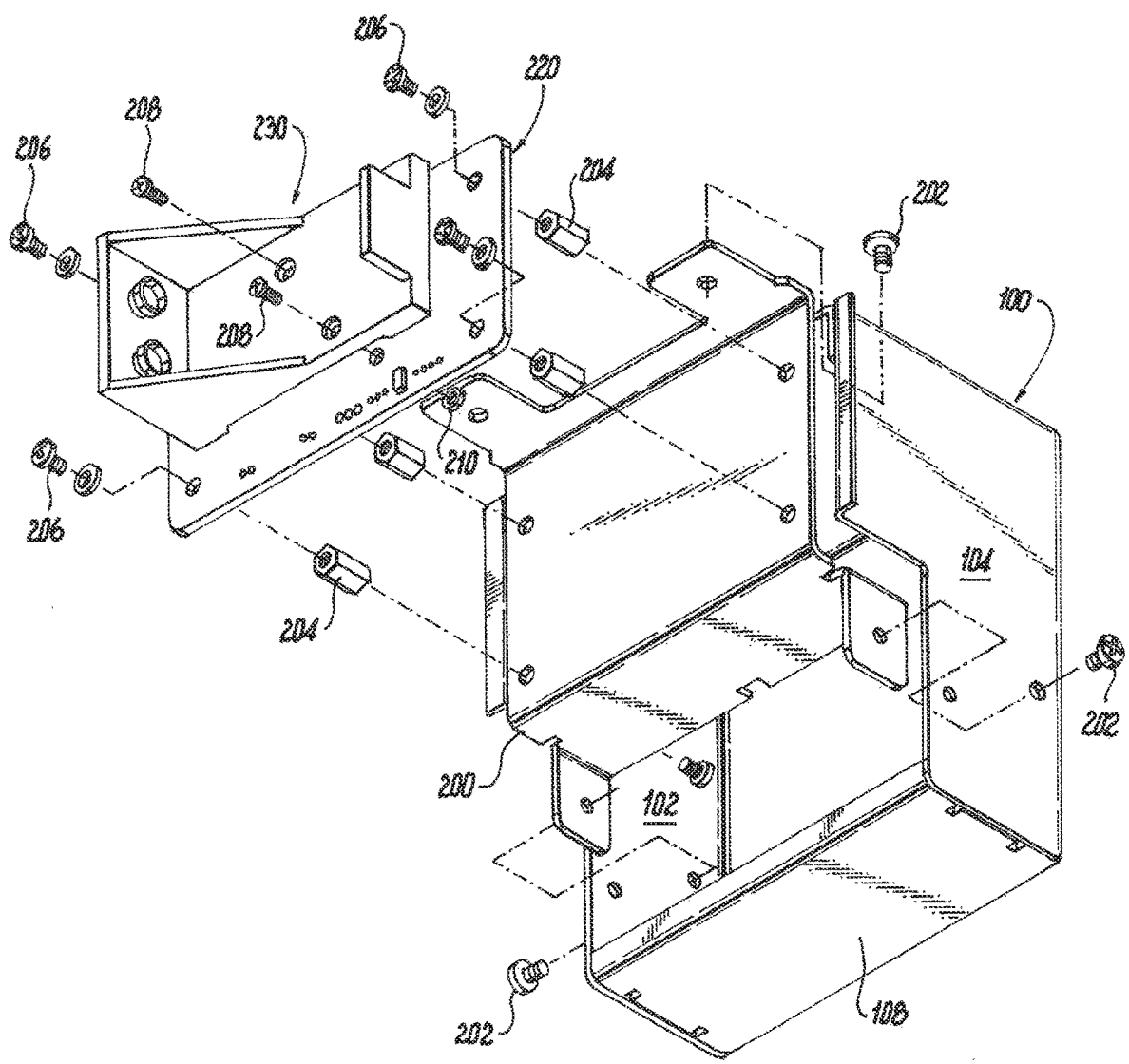
FIG. 11 is a bottom perspective view with parts separated of the flint trigger device according to the present disclosure with the main compartment cover and battery compartment cover removed and revealing the main compartment and the battery compartment within the housing of the flint trigger device.

Referring to FIG. 11, the housing 100 has a divider plate 200 that is secured within the housing via threaded screws 202. The divider plate 200 is used to separate a controller 220, e.g. a printed circuit board (PCB) assembly, and battery holder 230 within the battery compartment portion 114 of the housing 100 from the motor assembly 250 and flint assembly 280 within the main compartment portion 112 of the housing 100. The divider plate 200 blocks stray sparks that may be generated by the motor assembly 250 and the flint assembly 280 from damaging the PCB assembly 220 and battery within the battery holder 230. As shown in FIG. 11, the PCB assembly 220 is secured to the divider plate 200 using standoffs 204 threaded screws 205 and threaded screws 206. The PCB assembly 220 includes a microcontroller, such as a PIC10F220 microcontroller 222 manufactured by Microchip Technology Inc., or programmable logic controller (PLC), and known peripheral circuitry, such as a motor driver 224, e.g., a MOSFET motor driver seen in FIG. 11A, that controls the operation of the device 20, as will be described below. The battery holder 230 is secured to the PCB assembly 220 using threaded screws 208 and nuts 210.

It is noted that the housing 100 and the mold mounting assembly 170 are preferably made of a metallic or non-metallic material that can withstand the high temperatures generated by the exothermic reaction in the mold 30. Non-limiting examples of such metallic and non-metallic materials include steel, aluminum and carbon fiber.

Figure 27:
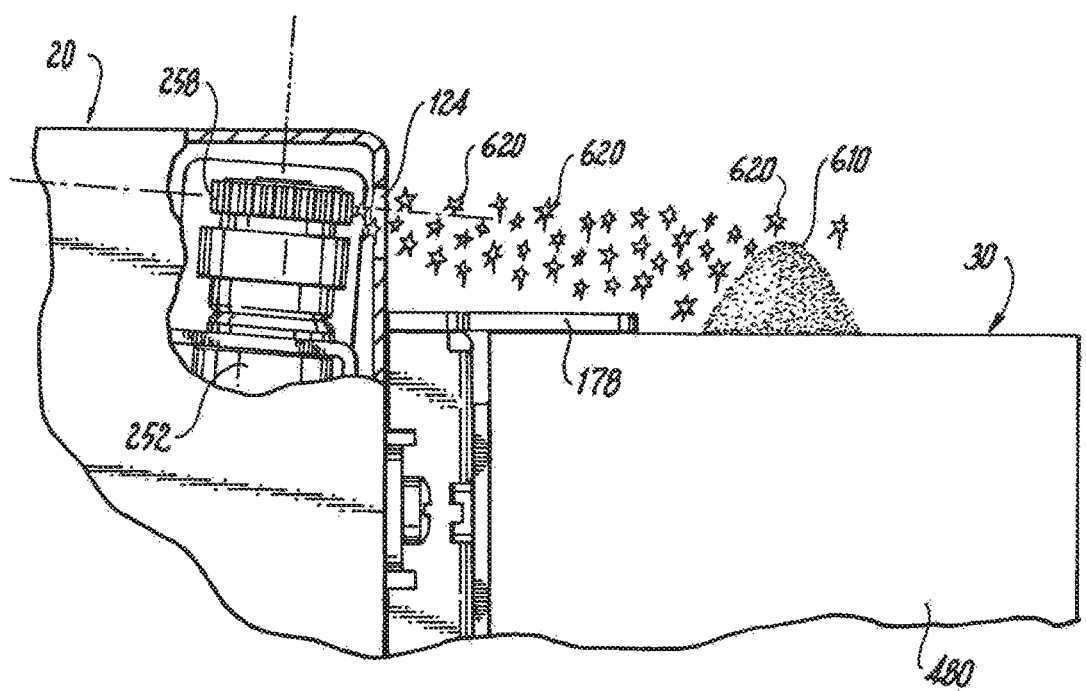
FIG. 27 is a top perspective view of the flint trigger device and exothermic mold of FIG. 26, illustrating sparks exiting the housing of the flint trigger device and impacting the starting powder.

Referring to FIGS. 12-17, the motor assembly and flint assembly according to the present disclosure will be described. The motor assembly 250 includes a motor 252, a motor bracket 254, a bushing 256 and a flint wheel 258. The motor 252 is secured to a motor support 254a on the motor bracket 254 such that the motor shaft 252a extends through a shaft opening 254b in the motor support 254a. The bushing 256 is attached to the motor shaft 252a with a friction fit such that a motor tab portion 256a on the bushing fits within the shaft opening 254a. Adjacent the motor tab portion 256a is a shoulder portion 256b of the bushing 256 that limits the distance the motor tab portion 256a can extend through the shaft opening 254b. Adjacent the shoulder portion 256b of the bushing 256 is a flint wheel shaft 256c, which fits within an opening 258a in the flint wheel 258. The flint wheel 258 includes a flint contacting surface 258b, which in the exemplary embodiment shown is a series of raises teeth-like members. As another example, the flint contacting surface 258b of the flint wheel 258 may be knurling around a periphery of the flint wheel. Other known types of flint contacting surfaces are also contemplated by the present disclosure. The motor bracket 254 is secured to the rear wall 110 of the housing 100 so that the motor shaft 252a is pointed in the general direction of the spark opening 124 in the rear wall, and the flint wheel 258 is positioned adjacent the spark opening 124, as shown. As shown in FIG. 14, the motor bracket 254 is secured to the rear wall 110 of the housing 100 using a machine screw 260, washers 262 and 264, and nut 266. The washers 262 and 264 can be any washers but are preferably thermal washers. As shown in FIG. 13, the motor support 254a on the motor bracket 254 is set at an angle "a" relative to the base 254c of the motor bracket. The angle "a" is set to position the flint wheel 258 so that sparks generated by the flint wheel exit the spark opening 124 in the rear wall 110 of the housing in a direction toward the fixture positioning member 178 of the mold mounting assembly 170 as seen in FIG. 27. As a non-limiting example, the angle "α" may be in the range of about 1 degree and about 15 degrees, and preferably about 5 degrees.

Figure 15:
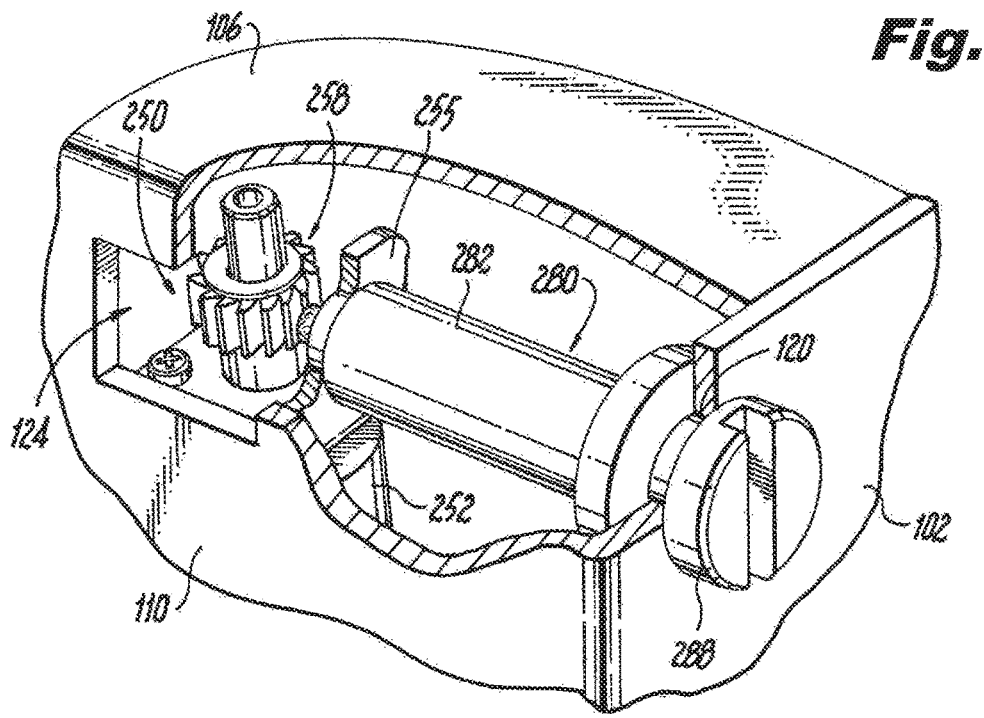
FIG. 15 is a perspective view of a portion of the flint trigger device housing cut away to reveal an exemplary embodiment of a flint assembly according to the present disclosure, illustrating a flint tube, a spring plug in one end of the flint tube and a flint extending from another end of the flint tube.
Figure 16:
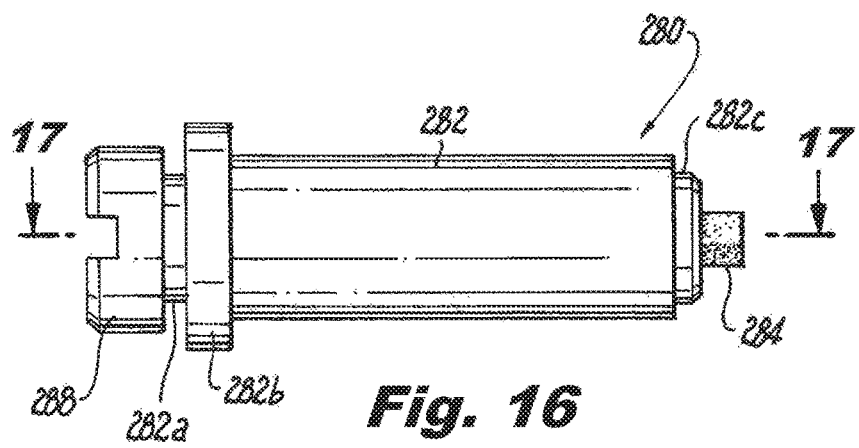
FIG. 16 is a side elevation view of the flint assembly of FIG. 15.
Figure 17:
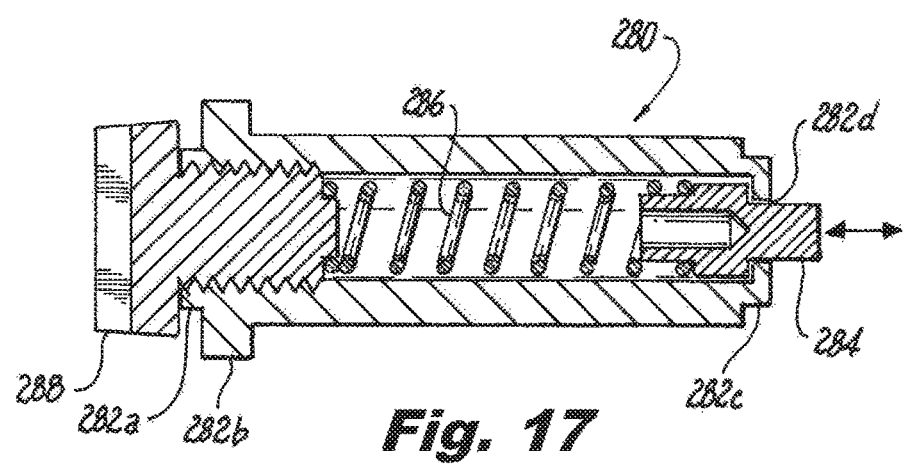
FIG. 17 is a cross-sectional view of the flint assembly of FIG. 16 taken along line 17-17 and illustrating a spring within the flint tube between the spring plug and the flint.

Continuing to refer to FIGS. 12-17, an exemplary embodiment of the flint assembly is shown. In this exemplary embodiment, the flint assembly 280 includes a flint tube 282, a flint 284, a flint spring 286 and a spring plug 288. As shown in FIGS. 15-17, the flint tube 282 has a proximal end and a distal end. The proximal end includes a first mounting tab 282a and a shoulder 282b, and the distal end includes a second mounting tab 282c and a flint opening 282d. In this exemplary embodiment, the flint tube 282 is secured within the main compartment portion 112 of the housing 100 with a wedge fit. More specifically, the first mounting tab 282a at the proximal end of the of the flint tube 282 is positioned within the flint tube aperture 120, seen in FIG. 12, in side wall 102 of the housing 100, and the second mounting tab 282c at the distal end of the flint tube 282 is positioned within a flint tube aperture 255a, seen in FIG. 12, in a flint tube support 255 attached to the motor support 254 of the motor bracket 254. It is noted that the flint tube support 255 is preferably perpendicular to the motor support 254 so that the flint 284 is aligned with the flint contacting surface 258b of the flint wheel 258. The flint 284 is secured to the flint spring 286, as seen in FIG. 17, and the flint and flint spring are inserted into the flint tube 282 so that the flint 284 can extend out of the flint opening 282d in the flint tube. The spring plug 288 is releasably secured to the proximal end of the flint tube 282 such that as the spring plug 288 moves toward the distal end of the flint tube the spring 286 is compressed applying a force on the flint 284 extending at least partially out of the flint opening 282d in the flint tube. As a non-limiting example, the spring holder may be a machine screw, such as a cheese head machine screw, that is threaded into a threaded proximal end of the flint tube 282.

Figure 11A:
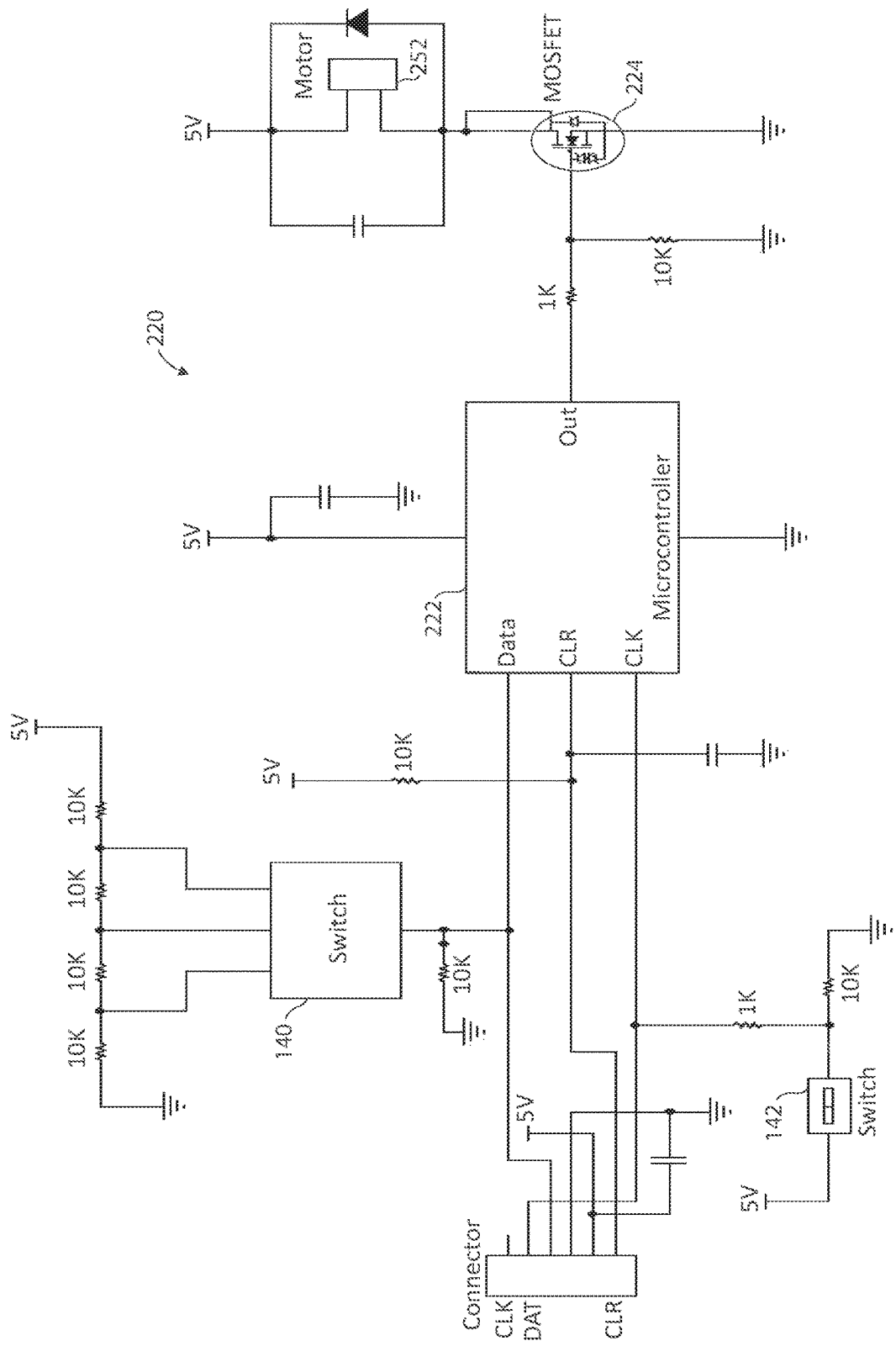
FIG. 11A is a schematic diagram for a printed circuit board assembly according to the present disclosure.
Figure 18:
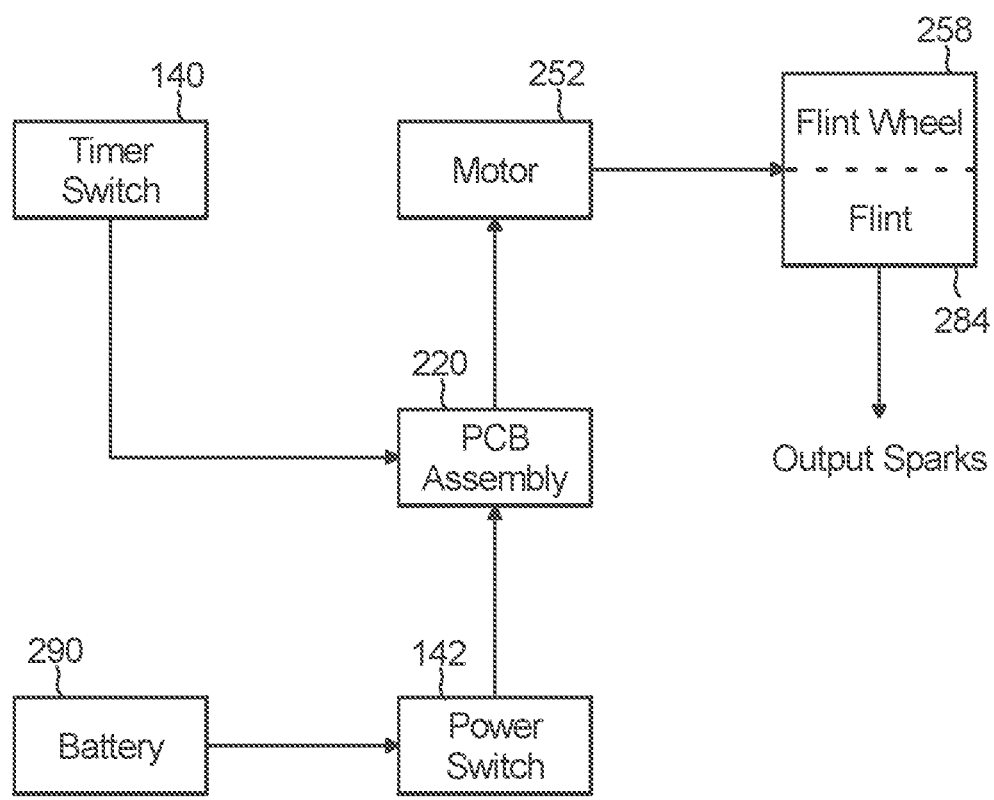
FIG. 18 is an exemplary block diagram of the internal components of the flint trigger device according to the present disclosure.

Turning now to FIGS. 11A and 18, an exemplary schematic and block diagrams of the operational components of the device 20 are shown. In this exemplary embodiment, the power switch 142 is electrically connected to a battery 290, which is installed in the battery holder 230 and selectively provides power to the PCB assembly 220. The timer switch 140 is electrically connected to the PCB assembly 220 and is used to set a time delay before the microcontroller 222 on the PCB assembly 220 (or the timer switch 140) activates the motor 252 via the motor driver 224. The microcontroller 222 is connected to the motor 252 and controls the operation of the motor. As described above, the flint wheel 258 is attached to the motor 252 and the flint 284, which is part of the flint assembly 280, is positioned so that it is in contact with the flint wheel. When the PCB assembly 220 activates the motor 252, rotational movement of the flint contacting surface 258b of the flint wheel 258 against the flint 284 creates sparks that are ejected from the spark opening 124 in the rear wall 110 of the housing 100.

Figure 19:
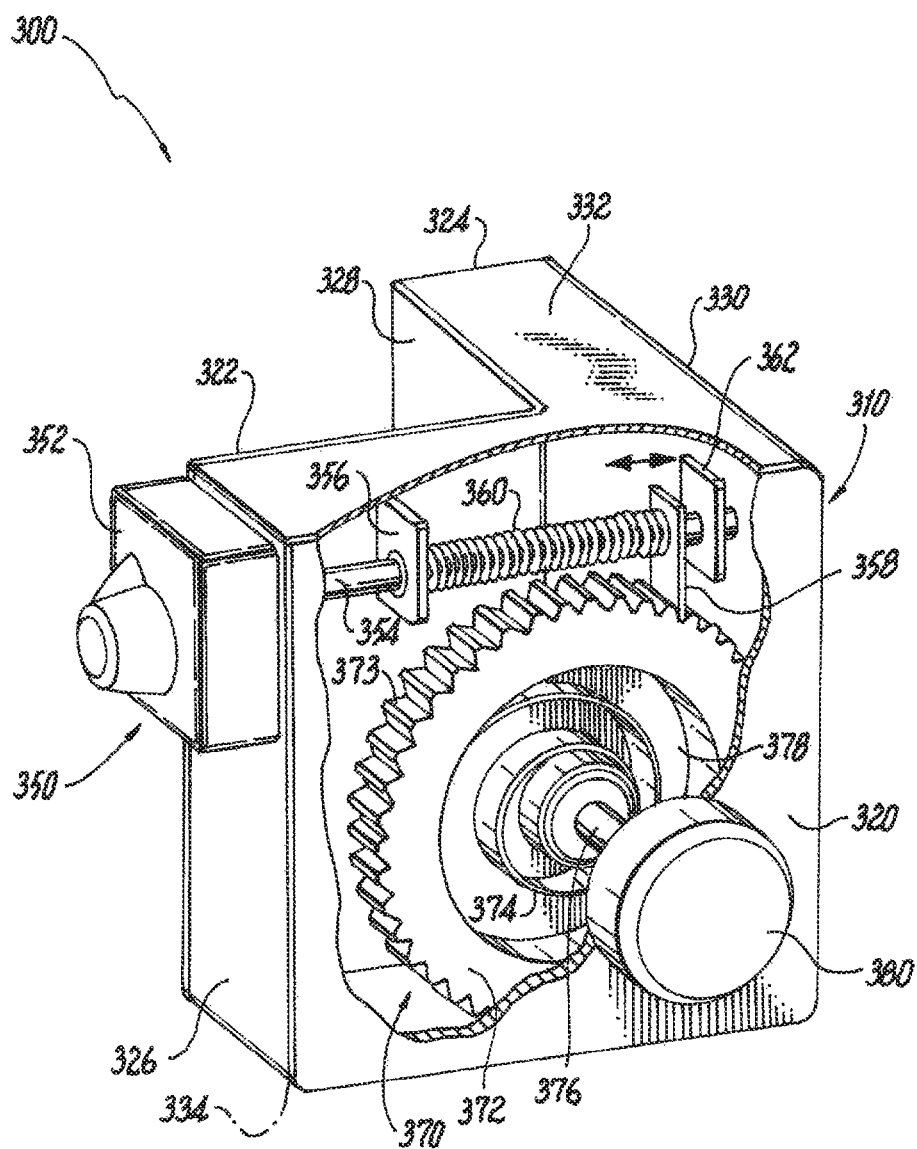
FIG. 19 is a side perspective view of another exemplary embodiment of a flint trigger device according to the present disclosure.
Figure 20:
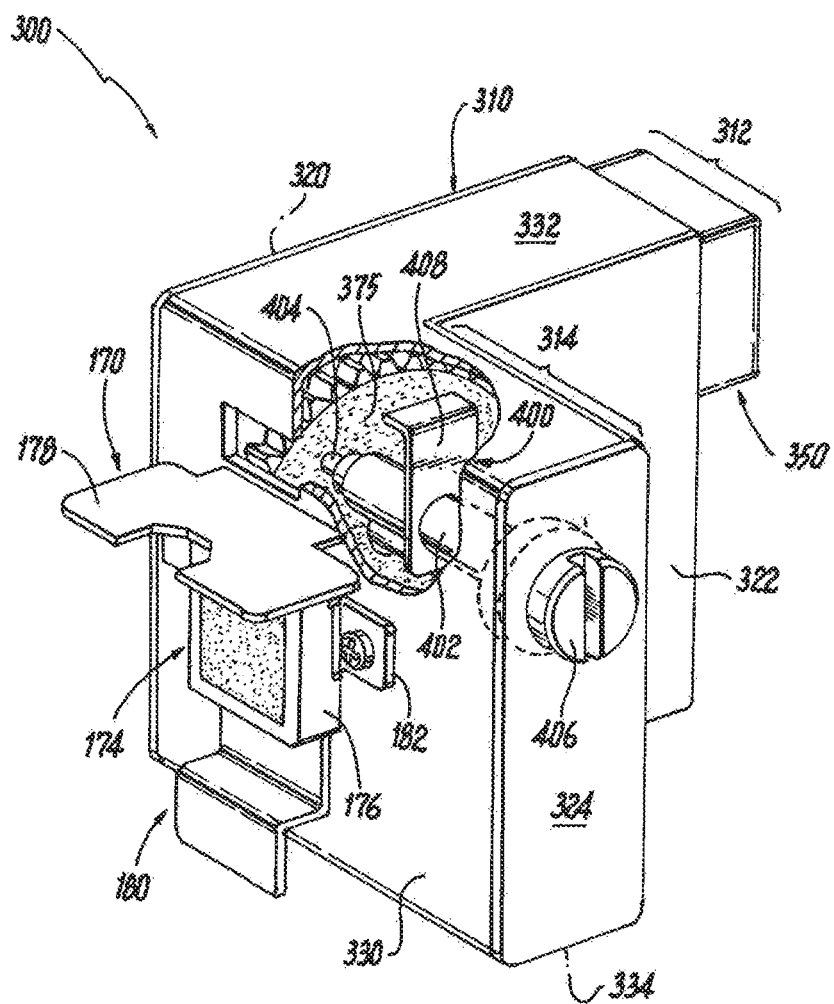
FIG. 20 is a rear perspective view of the flint trigger device of FIG. 19.

Referring now to FIGS. 19 and 20, another exemplary embodiment of a flint trigger device according to the present disclosure is shown. In this exemplary embodiment, the device 300 is a mechanical flint trigger device that includes a housing 310, a timer assembly 350, a flint wheel assembly 370 and a flint assembly 400. The housing 310 can be in a number of configurations sufficient to house and/or support the internal components of the device 300, including the timer assembly 350 and the flint wheel assembly 370. In the exemplary embodiment shown, the housing 310 is an L-shaped housing having a first side wall 320, a second side wall 322, a third side wall 324, a first front wall 326, a second front wall 328, a rear wall 330, a top wall 332 and a bottom wall 334. For general reference purposes, the housing 310 can be divided into a drive wheel portion 312 and a spark generating portion 314. Attached to the rear wall 330 of the housing 310 is a mold mounting assembly 170, which is described above and is not repeated. The drive wheel portion 312 of the housing 310 houses the timer assembly 350 and a portion of the drive wheel assembly 370, and the spark generating portion 314 of the housing houses a portion of the drive wheel assembly 370 and the flint assembly 400.

Continuing to refer to FIGS. 19 and 20, The timer assembly 350 includes a mechanical timer 352, a push arm 354, a first stabilizing bracket 356, a spring 360, a movable wheel stop 358 and a second stabilizing bracket 362. The mechanical timer 352 is operatively coupled to the push arm 354 which is supported by the stabilizing brackets 356 and 362. The spring 360 is positioned between the first stabilizing bracket 356 and the wheel stop 358 and secured to the wheel stop. The spring 360 normally pulls the wheel stop 358 into engagement with the teeth of the flint wheel. When the timer 352 counts down the set time, e.g., 5 seconds, 10 seconds or 15 seconds, a camming surface on a rotating wheel on the back of the timer 352 causes the push arm 354 to move toward the rear wall 110 of the housing 100 dislodging the wheel stop 358 from the flint wheel teeth 373. The drive wheel assembly 370 includes a drive wheel 372 having a mainspring 374 having one end secured to a spindle 376 within a hollow core 378 of the drive wheel 372, and a second end secured to an inner surface of the drive wheel. The spindle 376 is rotatably secured to the housing 310 so that the mainspring 374 can rotate drive wheel 372. One end of the spindle 376 extends through the first side wall 320 of the housing 310 and is connected to a knob 380 which can be manually rotated to wind the mainspring 374 around the spindle 376. The teeth 373 along the outer periphery of the drive wheel 373 interact with the wheel stop 358 to act as a pawl and ratchet mechanism to prevent rotation of the drive wheel 372 in one direction storing the wound mainspring energy. The flint assembly 400 is similar to the flint assembly 280 described above. More specifically, the flint assembly includes a flint tube 402, a flint 404, a flint spring (not shown) within the flint tube and a spring plug 406. A tube bracket 408 is secured to a housing wall and is used to support the flint tube 402 and hold the flint tube in position relative to the flint contacting surface 375 of the drive wheel 372. Similar to the flint assembly 280 described above, the flint 404 is secured to the flint spring and the flint and flint spring are inserted into the flint tube 402 so that the flint 404 can extend out of a flint opening in the flint tube. The spring plug 406 is releasably secured to the proximal end of the flint tube 402 such that as the spring plug 406 moves toward the distal end of the flint tube the spring is compressed applying a force on the flint 404 which is extending at least partially out of the flint opening in the flint tube. As a non-limiting example, the spring holder may be a machine screw, such as a cheese head machine screw, that is threaded into a threaded proximal end of the flint tube 402.

Figure 21:
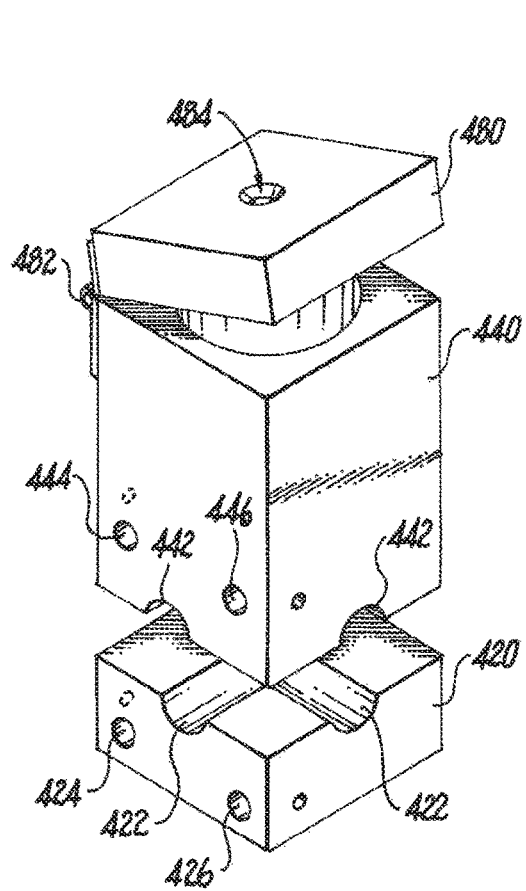
FIG. 21 is a top perspective view of an exemplary embodiment of an exothermic mold according to the present disclosure.
Figure 22:
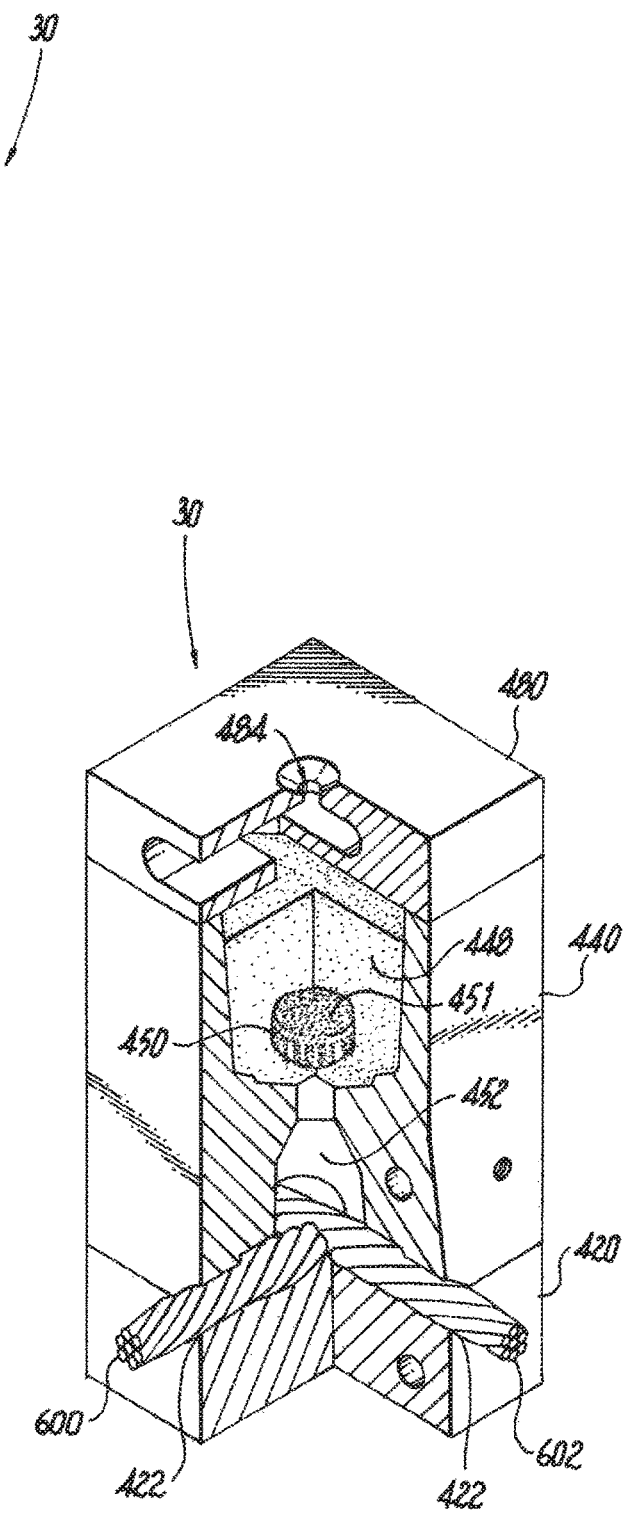
FIG. 22 is a top perspective view in partial cross-section of a portion of the exothermic mold of FIG. 21.
Figure 23:
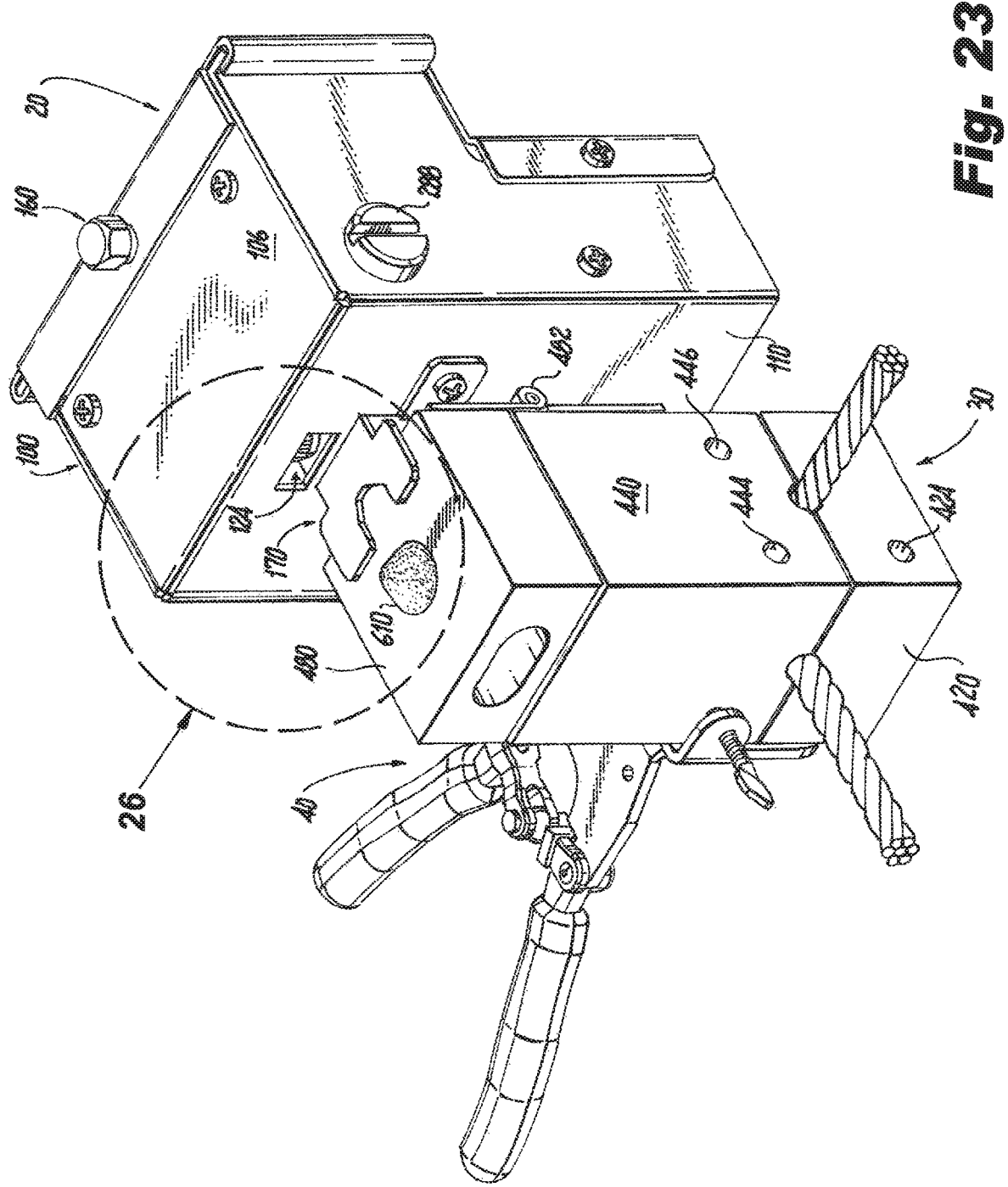
FIG. 23 is a top perspective view of another exemplary embodiment of an exothermic welding kit according to the present disclosure, illustrating the mold of FIG. 21, the handle clamp of FIG. 1 used to grip the mold, and a flint trigger device according to the present disclosure.

Referring now to FIGS. 21-23, an exemplary embodiment of a reusable mold that forms a portion of a kit for making exothermic welds is shown. In this exemplary embodiment, the mold is a horizontal mold having a lower mold portion 420, an upper mold portion 440 and a cover portion 480. The lower mold portion 420 includes one or more grooves 422 for receiving the part or parts to be welded, e.g., electrical conductors or cables. The lower mold portion 420 also includes a pair of handle clamp mounting holes 424 and 426 that receive the cantilevered pins 52 or 56 of, for example, the handle clamp 40. The upper mold portion 440 includes one or more grooves 442 for receiving the part or parts to be welded, e.g., electrical conductors or cables. The upper mold portion 440 also includes a pair of handle clamp mounting holes 444 and 446 that receive the cantilevered pins 52 or 56 of, for example, the handle clamp 40. The upper mold portion includes an internal crucible 448 in which a disc of weld material 450 is placed in a bottom portion of the crucible 448 and an weld metal powder can be poured into the crucible 448 on top of the disc of material 450. Non-limiting examples of the weld material include steel, aluminum, copper and other metallic materials used in exothermic welding. The upper mold portion also includes an orifice 452 that extends from the crucible 448 to the grooves 422 in the lower mold portion 420. The cover portion 480 is typically secured to the upper mold portion 440 via a hinge 482 so that the cover portion 480 can be pivoted (i.e., opened) permitting access to the crucible 448 within the upper mold portion 440. The cover portion 480 includes a hole 484 extending through the cover portion that is aligned with the crucible 448.

Figure 24:
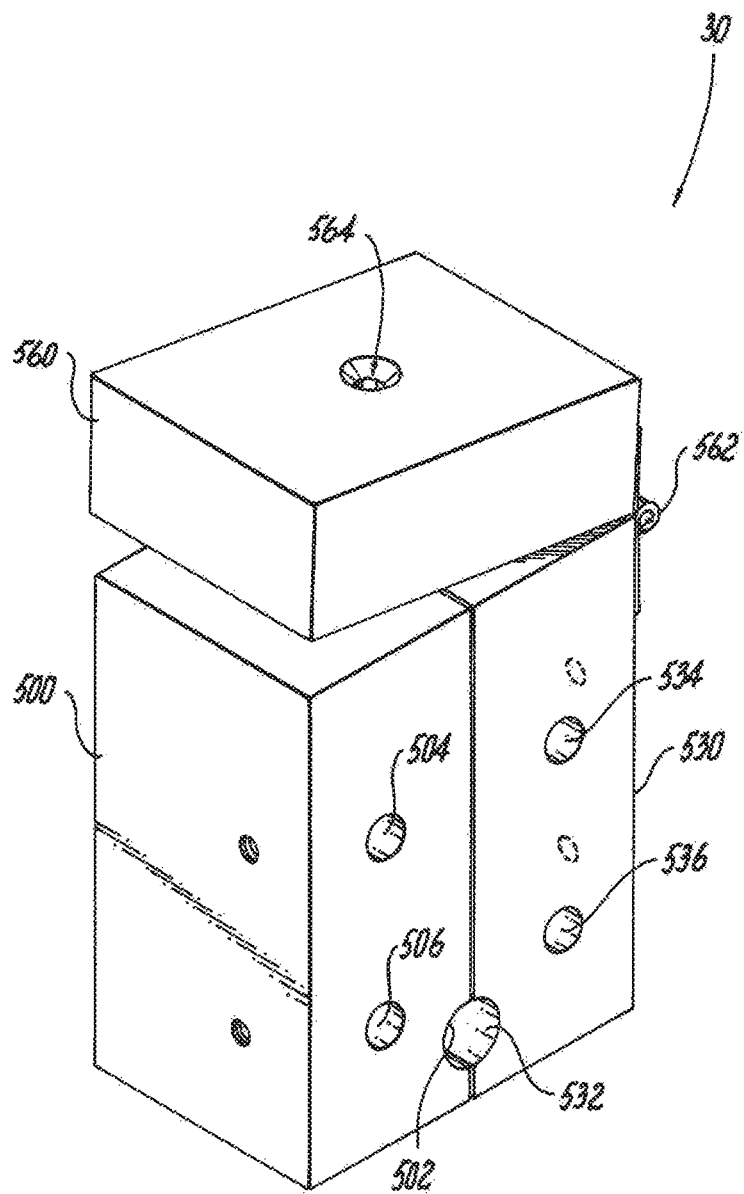
FIG. 24 is a top perspective view of another exemplary embodiment of an exothermic mold according to the present disclosure.
Figure 25:
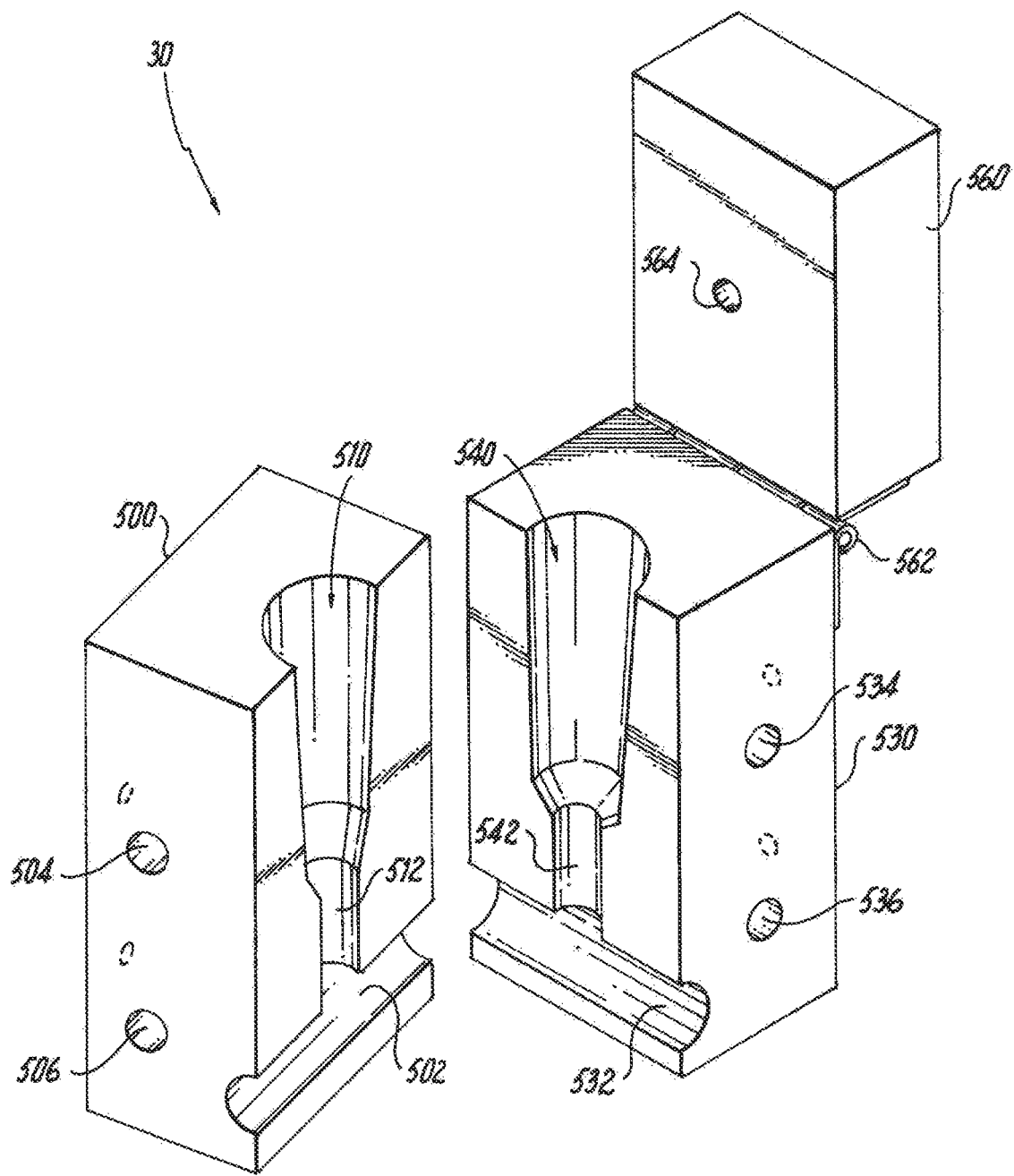
FIG. 25 is a top perspective view with parts separated of the exothermic mold of FIG. 24.

Referring now to FIGS. 24-25, another exemplary embodiment of a reusable mold that forms a portion of a kit for making exothermic welds is shown. In this exemplary embodiment, the mold 30 is a vertical mold having a first mold portion 500, a second mold portion 530 and a cover portion 560. The first mold portion 500 includes a pair of handle clamp mounting holes 504 and 506 that receive the cantilevered pins 52 or 56 of, for example, the handle clamp 40. Similarly, the second mold portion 530 includes a pair of handle clamp mounting holes 534 and 536 that receive the cantilevered pins 52 or 56 of, for example, the handle clamp 40. The first mold portion 500 includes a first crucible portion 510 and a first channel portion 512 that extends from the crucible portion 510 to the groove 502. The second mold portion 530 includes a second crucible portion 540 and a second channel portion 542 that extends from the crucible portion 540 to the groove 532. The first mold portion 500 also includes one or more grooves 502 for receiving the part or parts to be welded, e.g., electrical conductors or cables. Similarly, the second mold portion 530 includes one or more grooves 532 for receiving the part or parts to be welded, e.g., electrical conductors or cables. When the first crucible portion 510 is mated with the second crucible portion 540 a crucible is formed, and when the first channel portion 512 is mated with the second channel portion 542 a channel between the crucible and the first mold portion 500. A disc of weld material (not shown) can then be placed in a bottom portion of the crucible and a weld metal powder can be poured into the crucible on top of the disc of material. Non-limiting examples of the weld material include steel, aluminum, copper and other metallic materials used in exothermic welding.

The cover portion 560 can be secured to the first mold portion 500 or the second mold portion 530 via a hinge 562 so that the cover portion 560 can be pivoted to permit access to the crucible formed when the first mold portion is joined with the second mold portion. The cover portion 560 includes a hole 564 extending through the cover portion that is aligned with the crucible.

Figure 26:
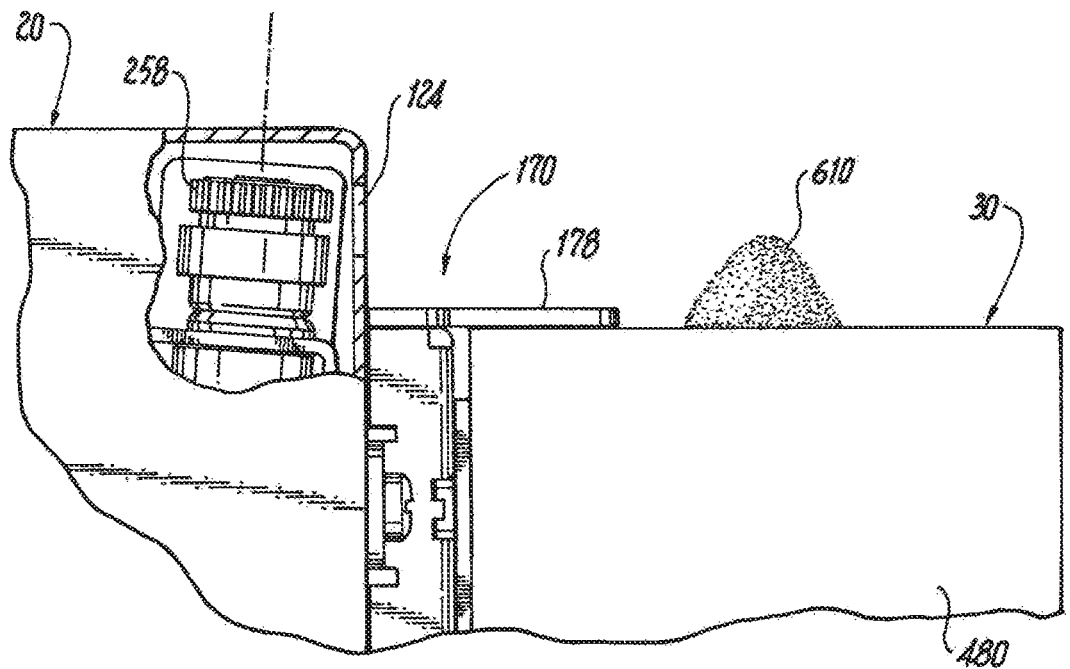
FIG. 26 is a side elevation view of a portion of the flint trigger device according to the present disclosure mounted to an exothermic mold according to the present disclosure, illustrating a starting powder on a top surface of the mold.

Referring now to FIGS. 26 and 27, to initiate an exothermic weld using the horizontal mold 30 of FIGS. 21-23, the parts to be welded, here electrical conductors 600 and 602, are placed in the grooves 422 in the lower mold portion 420. A handle clamp 40 is then secured to the lower and upper mold portions by inserting the cantilevered pins 52 and 56 into handle clamp mounting holes 444 and 446 in the mold portions. The cover portion 480 is then opened to expose the crucible 448 within the upper mold portion 440. A disc of weld material 450 is placed within the crucible 448 and an weld metal powder (not shown) is poured into the crucible 448 on top of the disc of material 450. The cover portion 480 is then closed and a flint trigger device 20 of the present disclosure is releasably attached to the mold 30. More specifically, the mold mounting assembly 170 is mounted to the hinge 482 of the mold 30 such that the fixture positioning member 178 of the mold mounting assembly is resting on the cover portion 480 of the mold 30, as shown in FIG. 23. The magnet assembly 174, seen in FIGS. 9 and 10, of the mold mounting assembly 170 is attracted to the hinge 482 on the mold 30 to releasable attach the mold mounting assembly to the mold. A starting powder 610 is then poured into the hole 484 in the cover portion 480 until a mound of starting powder is on the top surface of the cover portion 480, as seen in FIG. 26.

Figure 6:
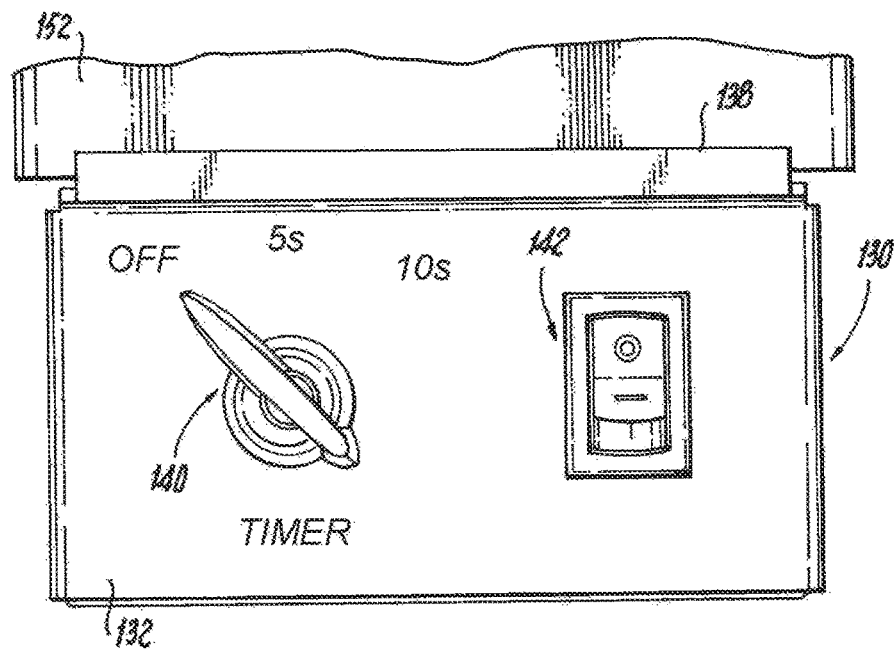
FIG. 6 is a front elevation view of an exemplary embodiment of the main compartment cover of the flint trigger device according to the present disclosure, illustrating a power switch and a timer switch.
Figure 7:
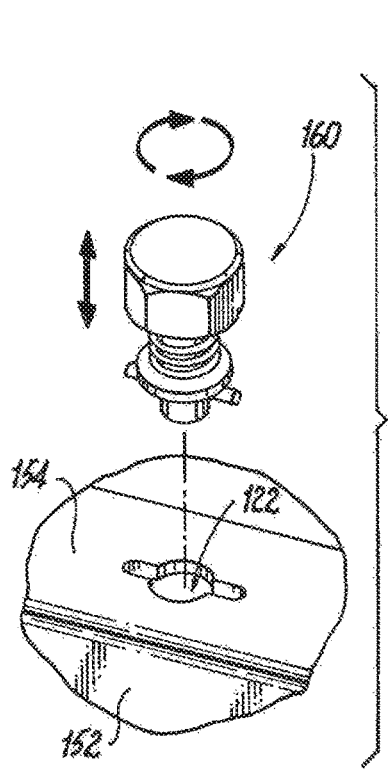
FIG. 7 is a top perspective view of a portion of the battery compartment cover of FIG. 5 and an exemplary embodiment of a lock assembly according to the present disclosure, illustrating a locking aperture in the battery compartment cover and the lock assembly positioned for insertion into the locking aperture.
Figure 8:
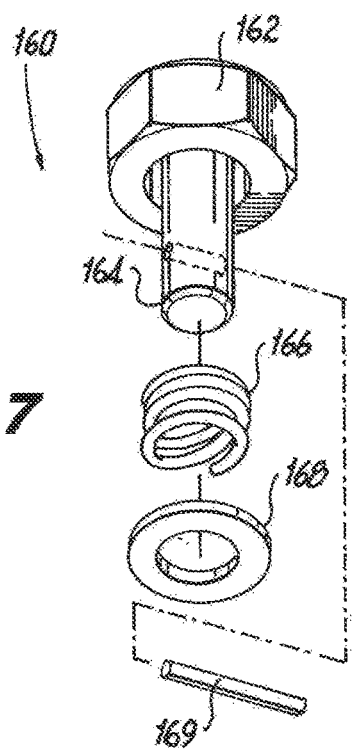
FIG. 8 is a perspective view with parts separated of the lock assembly of FIG. 7.

With the device 20, mold 30 and handle clamp 40 ready to initiate the exothermic reaction, the timer switch 140 on the device 20 is then rotated to a desired time delay, e.g., 5 second delay, 10 second delay or 15 second delay, as seen in FIG. 6. The power switch 142 is turned ON to energize the PCB assembly 220 and activate the timer switch 140 (and/or the microcontroller 222) to begin to countdown the selected time delay. This allows a technician time in which to withdraw from the area where the exothermic reaction is to occur. When the timer switch 140 (and/or the microcontroller 222) completes its countdown, the PCB assembly 220 activates the motor 252. As the motor shaft 252a rotates the flint wheel 258 rotates causing the flint contacting surface 258b of the flint wheel to engage the flint 284 creating sparks 620 that travel through the spark opening 124 in the rear wall 110 of the housing 100 toward the starting powder 610 which ignites the starting powder. The ignited starting powder 610 then ignites the weld metal powder (not shown) within the crucible 448 initiating the exothermic weld.

When the weld metal powder ignites, an exothermic reaction is created in the crucible 448. The exothermic reaction liquefies the weld metal powder and the disc of material 450 which then flows down from the crucible 448 through the orifice 452 into the lower mold portion 420 holding the parts to be joined. When the mold 30 has sufficiently cooled, the handle clamp 40 is removed from the mold 30 and the lower mold portion 420 is separated from the upper mold portion 440 exposing the parts, e.g., electrical conductors 600, 602, welded together with a solid molecular bond. It is noted that during the exothermic reaction, sparks, flames and hot gasses may be discharged from the mold 30.

Referring now to FIGS. 28-32, another exemplary embodiment of a device according to the present disclosure is shown. In this exemplary embodiment, the device 700 is an electronic type trigger device that includes the housing 100, the main compartment cover 130, the battery compartment cover 150 and the mold mounting assembly 170, which are described above. However, in this exemplary embodiment, the controller 220 is replaced with a controller 770, and the motor and flint assemblies are removed and replaced with an electronic ignitor assembly 710.

Figure 28:
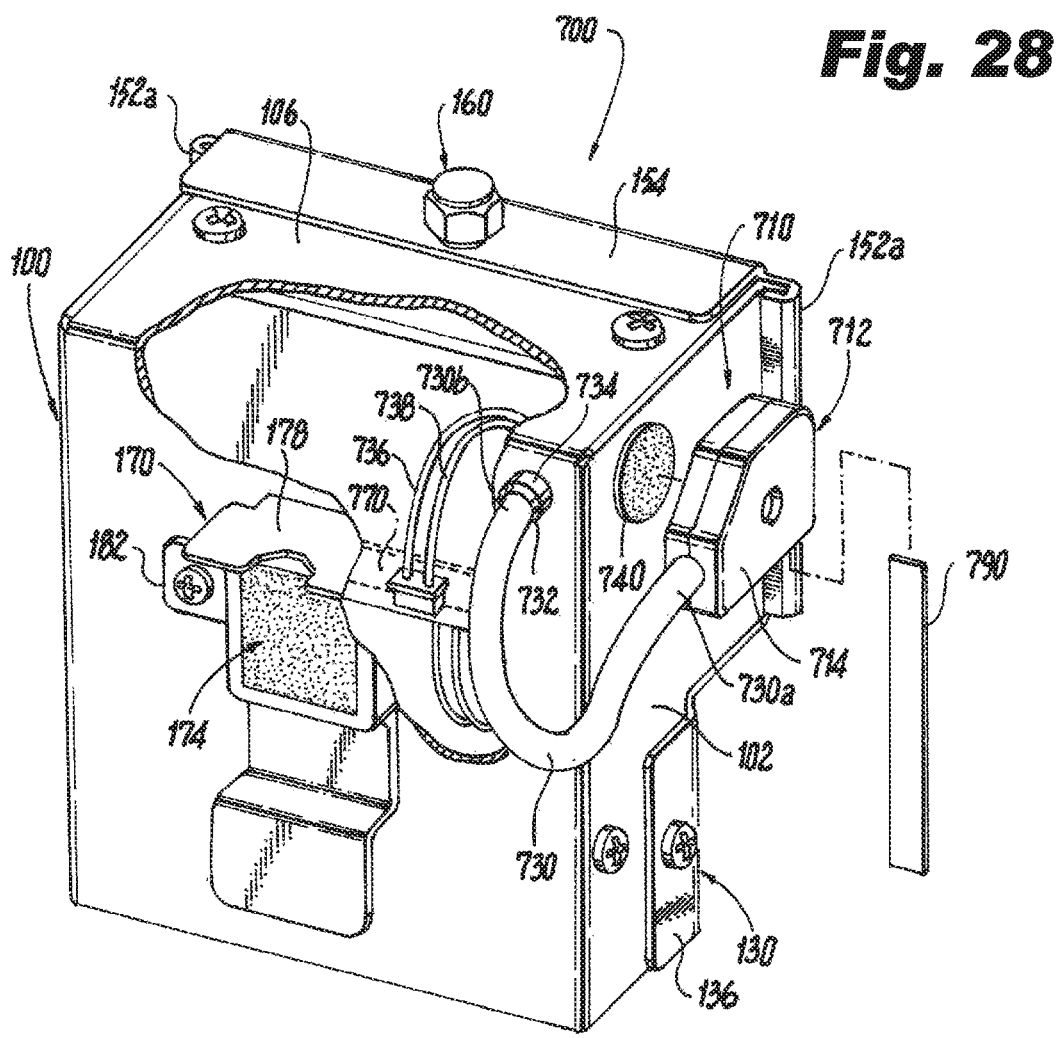
FIG. 28 is a rear perspective view another exemplary embodiment of a trigger device according to the present disclosure, illustrating an electronic type trigger device with an ignition box electrically coupled to a controller within a housing, and an ignitor positioned to be attached to the ignition box.
Figure 29:
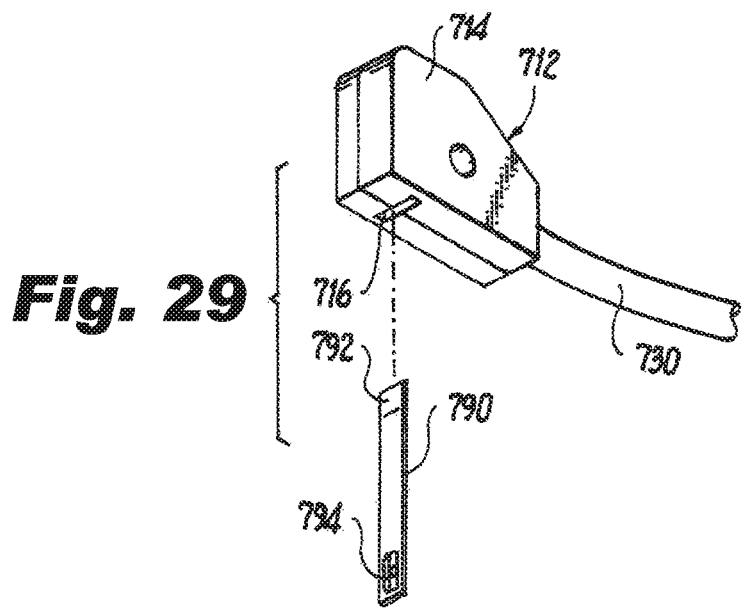
FIG. 29 is a bottom perspective view of the ignition box and ignitor of FIG. 28.

Referring to FIGS. 28 and 29, the electronic ignitor assembly 710 includes an ignition box 712 and a cable 730. The ignition box 712 includes a housing 714 having a port 716. The port 716 is configured to receive an ignitor 790, as described below. The ignition box 712 also includes a first electrode or contact (not shown) mounted within the housing 714 on one side of the port 716 and a second electrode or contact (not shown) mounted within the housing 714 on the other side of the port 716. The first electrode is spaced from the second electrode so that the ignitor 790 can be inserted into the port 716 and gripped by the electrodes. The cable 730 has a first end 730a and a second end 730b. The outer sheathing of the first end 730a of the cable 730 is connected to the housing 714 of the ignition box 712 such that a first electrical wire within the cable 730 is hard wired to the first electrode and a second electrical wire within the cable 730 is hard wired to the second electrode. The second end 730b of the cable 730 may include a connector 732 that can be removably coupled or attached to a corresponding connector 734 mounted to the housing 100. The connector 734 mounted to the housing 100 is electrically connected to the controller 770 within the housing 100 via wires 736 and 738. In another exemplary embodiment, the first end 730a of cable 730 may include a connector (not shown) that can be connected or coupled to a corresponding connector (not shown) mounted to the housing 714 of the ignition box 712 so that cable 730 can be removably coupled or attached to the ignition box 712. In another exemplary embodiment, the outer sheathing of the second end 730b of the cable 730 may be connected to the housing 100 and the first and second wires in the cable may be hard wired to the controller 770. When not in use, the housing 714 of the ignition box 712 may be releasably attach to the housing 100 of the device 700 using, for example, a hook and loop type structure 740 or a magnet attached to the housing 714.

Figure 30:
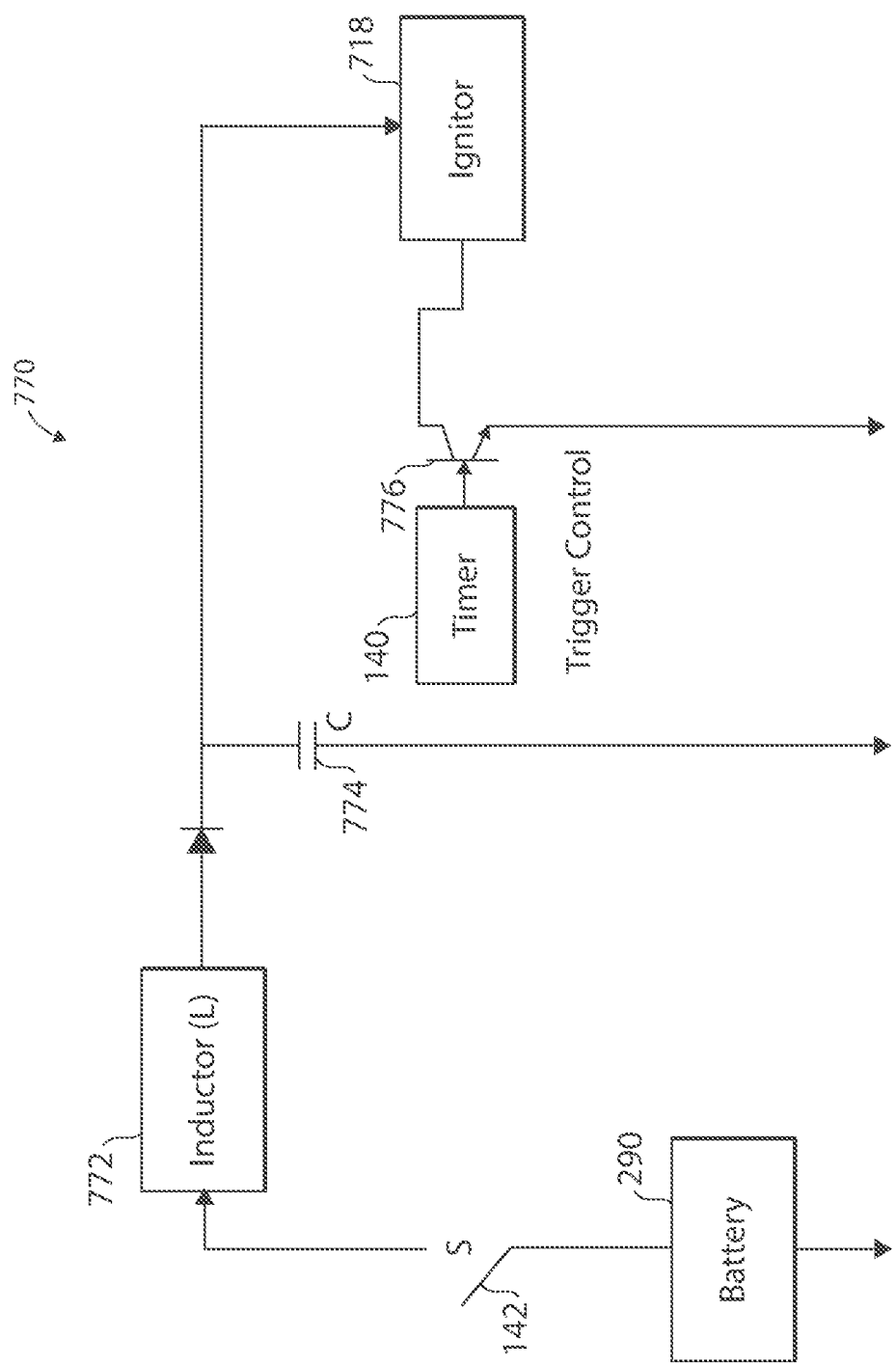
FIG. 30 is block diagram of electronic components for the electronic type trigger device of FIG. 28.

Referring to FIG. 30, the controller 770, e.g. a printed circuit board (PCB) assembly, is secured within the battery compartment portion 114 of the housing 100 similar to controller 220 described above. In this exemplary embodiment, the controller 770 is configured to provide a pulse to ignite the weld metal powder within the crucible of the exothermic mold, e.g., mold 30 seen in FIG. 1, to initiate an exothermic reaction. The timer switch 140 and the components within the controller 770 powering the electronic ignition assembly 710 are powered by the battery 290, which is described above.

An exemplary operation of the controller 770 of this exemplary embodiment will be described. With the battery 290 plugged into the battery holder 230, power is provided to the controller 770 including the timer switch 140 and the power switch 142. In this exemplary embodiment, the power switch 142 is a "MOMENTARY ON" switch which temporarily supplies a voltage from the battery 290 to an inductor 772 to charge a capacitor 774 to a predefined voltage, such as for example between 6 volts and 12 volts. At this point, the timer switch 140 sets a trigger control transistor 776 "OFF." The timer switch 140 is then set and when the timer 140 completes its cycle, e.g., when the timer reaches zero, the trigger control transistor 776 turns "ON" causing the capacitor 774 to discharge sending a voltage pulse to the ignition box 712 and an ignitor 790 within the port 716 of the ignitor box 712.

Referring again to FIG. 29, the ignitor 790 is inserted or plugged into a port 716 provided in ignition box 712. In this exemplary embodiment, the ignitor 790 is a disposable ignitor. However, the ignitor may be a permanent ignitor. The ignitor 790 includes one or more contacts 792 which engage the electrodes (or contacts) within the port 716 as described above. The distal end 794 of ignitor 790 includes an ignition material which may include a strip of wire of two different metallic elements in contact with each other. As a non-limiting example, the metallic elements may be palladium and aluminum.

Figure 31:
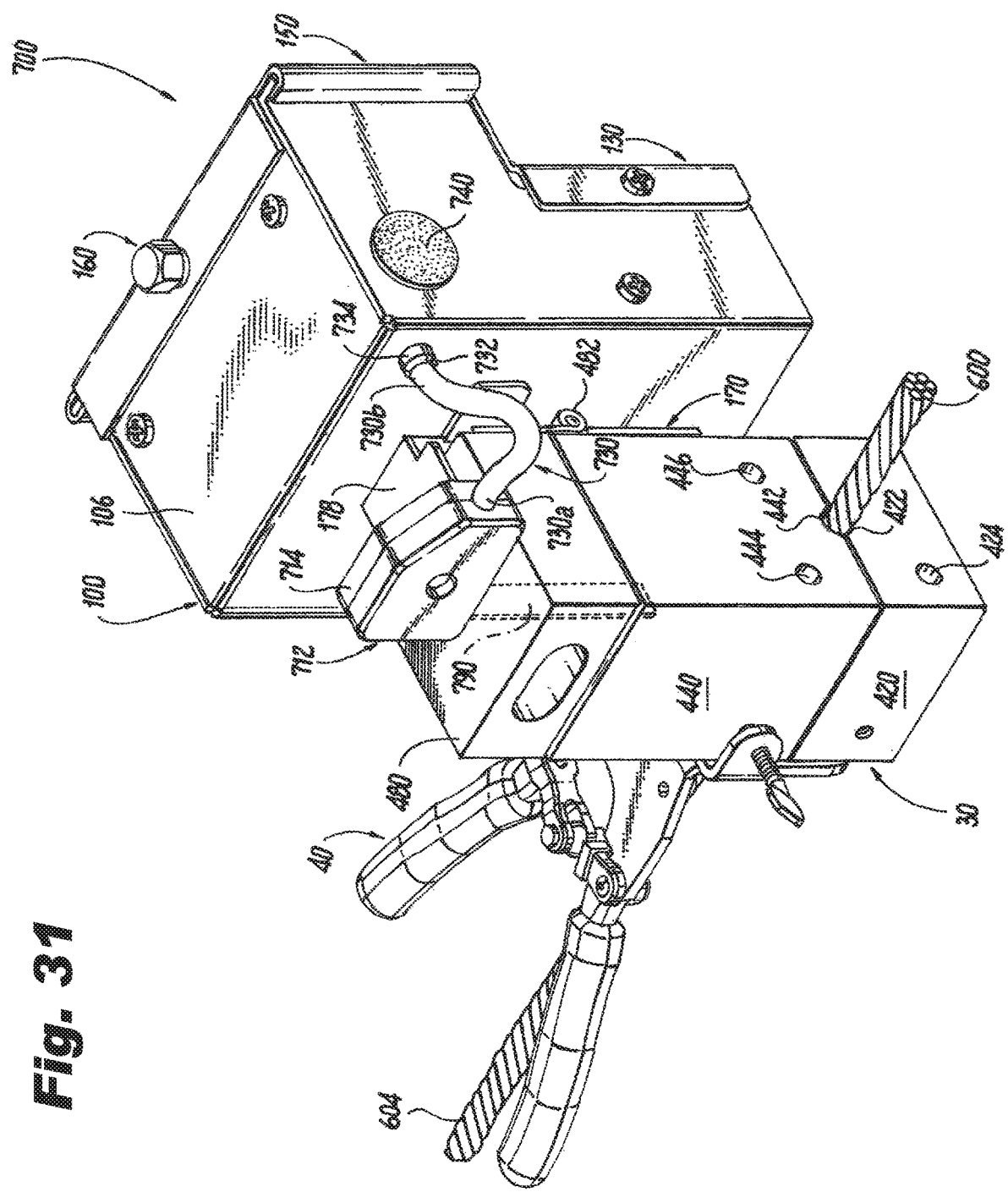
FIG. 31 is a top perspective view of another exemplary embodiment of an exothermic welding kit according to the present disclosure, illustrating the mold and handle clamp of FIG. 1, and the electronic trigger device of FIG. 28 with the ignition box positioned on the mold and the ignitor within a crucible of the mold.
Figure 32:
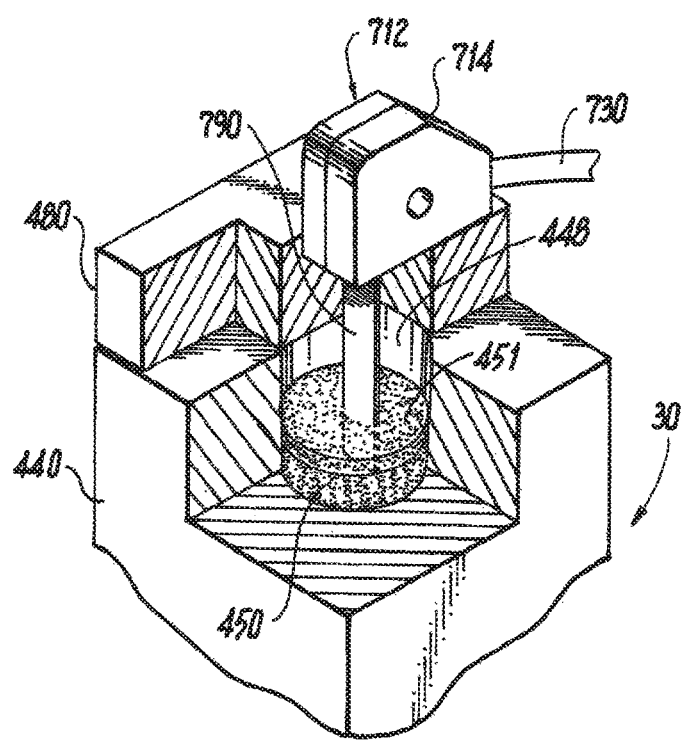
FIG. 32 is a top perspective view of a portion of the mold and ignition box of FIG. 30, illustrating the ignitor within the crucible of the mold.

The operation of the device 700 included in a kit that includes the mold 30 and the handle clamp 40 will be described with reference to FIGS. 31 and 32. To initiate an exothermic weld using this kit, the parts to be welded, here electrical conductors 600 and 604, are placed in the grooves 422 in the lower mold portion 420. The handle clamp 40 is then secured to the lower and upper mold portions by inserting the cantilevered pins 52 and 56, seen in FIG. 1, into the handle clamp mounting holes, 424, 426, 444 and 446 in the mold portions 420 and 440. The cover portion 480 of the mold 30 is then opened to expose the crucible 448 within the upper mold portion 440. A disc of weld material 450 is placed within the crucible 448 and a weld metal powder 451 is poured into the crucible 448 on top of the disc of material 450. The cover portion 480 is then closed and a device 700 is releasably attached to the mold 30. More specifically, the mold mounting assembly 170 is mounted to the hinge 482 of the mold 30 such that the fixture positioning member 178 of the mold mounting assembly 170 is resting on the cover portion 480 of the mold 30, as shown in FIG. 31. The magnet assembly 174, seen in FIGS. 9 and 10, of the mold mounting assembly 170 is attracted to the hinge 482 on the mold 30 to releasable attach the mold mounting assembly to the mold. An ignitor 790 is then inserted into the port 716 of the ignition box 712 so that the ignitor 790 is coupled to the electrodes within the housing 714 of the ignition box 712. The ignitor 790 coupled to the ignition box 712 is inserted into the hole 484, seen in FIG. 22, extending through the cover portion 480 of the mold 30. As described above, the hole 484 is aligned with the crucible 448, such that the ignitor 790 extends into the weld metal powder 451 within the crucible 448, as seen in FIG. 32. With the device 700, mold 30 and handle clamp 40 ready to initiate the exothermic reaction, the power switch 142 is momentarily turned ON to charge the capacitor 774 of the controller 770. The timer switch 140 on the device 700 is then rotated to a desired time delay, e.g., 5 second delay, 10 second delay or 15 second delay, as seen in FIG. 6. and begins to countdown the selected time delay. This allows a technician time in which to withdraw from the area where the exothermic reaction is to occur. When the timer switch 140 completes its countdown, the capacitor 774, seen in FIG. 30, discharges sending a voltage pulse to the ignition box 712 and the ignitor 790 within the port 716 of the ignitor box 712 igniting the weld metal powder 451 initiating an exothermic reaction in the crucible 448. The exothermic reaction liquefies the weld metal powder 451 and the disc of material 450 which then flows down from the crucible 448 through the orifice 452, seen in FIG. 22, into the lower mold portion 420 holding the parts to be joined. When the mold 30 has sufficiently cooled, the handle clamp 40 is removed from the mold 30 and the lower mold portion 420 is separated from the upper mold portion 440 exposing the parts, e.g., electrical conductors 600, 604, welded together with a solid molecular bond.

In the embodiments described herein, the housing is constructed from a material that can withstand high temperatures. As non-limiting examples, the housing may be constructed from metal, e.g., stamped steel, spring steel, and/or aluminum. Alternatively, steel, brass, aluminum or other appropriate alloy may be used for the appropriate components. Of course, other types of materials such as high temperature plastics, composites, etc. may be used as desired and where appropriate.

As shown throughout the drawings, like reference numerals designate like or corresponding parts. While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. A flint trigger device, comprising:
   a housing having a spark opening on a rear wall of the housing;
   a mold mounting assembly secured to an exterior of the rear wall of the housing;
   a motor assembly secured to the rear wall of the housing and in the interior of the housing, the motor assembly having a flint wheel attached to a shaft of a motor, wherein the flint wheel is located adjacent the spark opening;
   a flint assembly within the housing and positioned such that a flint of the flint assembly is in contact with the flint wheel; and
   a controller positioned within the housing configured to selectively activate the motor to cause the flint wheel to rotate against the flint to create one or more sparks to be ejected from the spark opening.

2. The flint trigger device according to claim 1, further comprising a timer switch operatively connected to the controller and configured to countdown a selected time delay before the controller selectively activates the motor.

3. The flint trigger device according to claim 1, wherein the mold mounting assembly comprises a magnet fixture configured to be mounted to an exothermic mold and a magnet assembly housed within the magnet fixture and configured to releasably attach the magnet fixture to the exothermic mold.

4. The flint trigger device according to claim 3, wherein the magnet fixture comprises a magnet compartment to house the magnet fixture, a fixture positioning member extending from the magnet fixture and configured to rest on a cover of the exothermic mold.

5. The flint trigger device according to claim 3, wherein the magnet assembly releasably attaches the magnet fixture to a hinge of the exothermic mold.

6. The flint trigger device according to claim 5, wherein the magnet fixture comprises a hinge bridge adjacent the magnet compartment that permits the magnet fixture to span a pin joint of the hinge.

7. The flint trigger device according to claim 1, wherein the motor assembly is secured to the rear wall of the housing using a motor bracket having a base and a motor support, wherein the motor support is at an angle relative to the motor base.

8. The flint trigger device according to claim 7, wherein the motor support is at an angle ranging between about 1 degree and about 15 degrees relative to the motor base.

9. The flint trigger device according to claim 7, wherein the motor support is at an angle of about 5 degrees relative to the motor base.

10. The flint trigger device according to claim 1, wherein flint assembly comprises:
    a flint tube secured between a wall of the housing and a flint tube support within the housing;
    a flint spring within the flint tube; and
    the flint being coupled to the flint spring and extending through the flint tube so that the flint is in contact with the flint wheel.

11. The flint trigger device according to claim 1, wherein the controller comprises a PCB assembly.

12. An exothermic welding kit comprising:
    an exothermic mold; and
    a flint trigger device, wherein the flint trigger device comprises:
      a housing having a spark opening on a rear wall of the housing;
      a mold mounting assembly secured to an exterior of the rear wall of the housing;
      a motor assembly secured to the rear wall of the housing and in the interior of the housing, the motor assembly having a flint wheel attached to a shaft of a motor, wherein the flint wheel is located adjacent the spark opening;
      a flint assembly within the housing and positioned such that a flint of the flint assembly is in contact with the flint wheel; and
      a controller positioned within the housing configured to selectively activate the motor to cause the flint wheel to rotate against the flint to create one or more sparks to be ejected from the spark opening.

13. The exothermic welding kit according to claim 12, further comprising a handle clamp for gripping the exothermic mold.

14. The exothermic welding kit according to claim 12, further comprising a timer switch operatively connected to the PCB assembly and configured to countdown a selected time delay before the PCB assembly selectively activates the motor.

15. The exothermic welding kit according to claim 12, wherein the mold mounting assembly comprises a magnet fixture configured to be mounted to an exothermic mold and a magnet assembly housed within the magnet fixture and configured to releasably attach the magnet fixture to the exothermic mold.

16. The exothermic welding kit according to claim 15, wherein the magnet fixture comprises a magnet compartment to house the magnet fixture, a fixture positioning member extending from the magnet fixture and configured to rest on a cover of the exothermic mold.

17. The exothermic welding kit according to claim 15, wherein the magnet assembly releasably attaches the magnet fixture to a hinge of the exothermic mold.

18. The exothermic welding kit according to claim 17, wherein the magnet fixture comprises a hinge bridge adjacent the magnet compartment that permits the magnet fixture to span a pin joint of the hinge.

19. The exothermic welding kit according to claim 12, wherein the motor assembly is secured to the rear wall of the housing using a motor bracket having a base and a motor support, wherein the motor support is at an angle relative to the motor base.

20. The exothermic welding kit according to claim 19, wherein the motor support is at an angle ranging between about 1 degree and about 15 degrees relative to the motor base.

21. The exothermic welding kit according to claim 19, wherein the motor support is at an angle of about 5 degrees relative to the motor base.

22. The exothermic welding kit according to claim 12, wherein flint assembly comprises:
- a flint tube secured between a wall of the housing and a flint tube support within the housing;
- a flint spring within the flint tube; and
- the flint being coupled to the flint spring and extending through the flint tube so that the flint is in contact with the flint wheel.

23. The exothermic welding kit according to claim 12, wherein the controller comprises a PCB assembly.

24. The exothermic welding kit according to claim 12, wherein the exothermic mold is a horizontal mold.

25. The exothermic welding kit according to claim 12, wherein the exothermic mold is a vertical mold.

26. A method for initiating an exothermic reaction within an exothermic mold, the method comprising:
- inserting a disc of welding material into a crucible within the exothermic mold;
- pouring an exothermic reaction powder into the crucible;
- mounting a flint trigger device to the mold, wherein the flint trigger device comprises:
  - a housing having a spark opening on a rear wall of the housing;
  - a mold mounting assembly secured to an exterior of the rear wall of the housing;
  - a motor assembly secured to the rear wall of the housing and in the interior of the housing, the motor assembly having a flint wheel attached to a shaft of a motor, wherein the flint wheel is located adjacent the spark opening;
  - a flint assembly within the housing and positioned such that a flint of the flint assembly is in contact with the flint wheel; and
  - a controller positioned within the housing configured to selectively activate the motor to cause the flint wheel to rotate against the flint to create one or more sparks to be ejected from the spark opening;
- pouring a starting powder into an opening in a cover of the mold such that a mound of starting powder rests on the cover of the mound; and
- activating the flint trigger device to eject the one or more sparks from the spark opening in the housing such that the one or more sparks impact the starting powder causing the starting powder to ignite which causes the exothermic reaction powder to ignite initiating the exothermic reaction within the exothermic mold.

* * * * *